(12) United States Patent
Dolphin

(10) Patent No.: US 8,933,382 B2
(45) Date of Patent: Jan. 13, 2015

(54) GUIDANCE SYSTEM AND METHOD FOR MISSILE DIVERT MINIMIZATION

(75) Inventor: Andrew E. Dolphin, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 420 days.

(21) Appl. No.: 13/076,690

(22) Filed: Mar. 31, 2011

(65) Prior Publication Data

US 2012/0248237 A1     Oct. 4, 2012

(51) Int. Cl.
| | |
|---|---|
| *F42B 15/01* | (2006.01) |
| *F41G 9/00* | (2006.01) |
| *G05D 1/10* | (2006.01) |
| *G05D 1/12* | (2006.01) |
| *F42B 15/00* | (2006.01) |

(52) U.S. Cl.
CPC ............ *F42B 15/01* (2013.01); *G05D 1/107* (2013.01); *G05D 1/12* (2013.01)
USPC .......................................... 244/3.15; 244/3.1

(58) Field of Classification Search
CPC .......... G05D 1/10; G05D 1/107; G05D 1/12; F42B 15/01; F41G 7/20; F41G 7/22; F41G 9/00
USPC ..................... 244/3.1–3.3; 89/1.11
See application file for complete search history.

(56) References Cited

U.S. PATENT DOCUMENTS

| | | | | |
|---|---|---|---|---|
| 3,164,339 | A * | 1/1965 | Schroader et al. ............ | 244/3.13 |
| 3,169,727 | A * | 2/1965 | Schroader et al. ............ | 244/3.13 |
| 3,230,348 | A * | 1/1966 | Hammond, Jr. ............. | 244/3.13 |
| 4,387,865 | A * | 6/1983 | Howard et al. ................ | 244/3.1 |
| 4,783,744 | A | 11/1988 | Yueh | |
| 4,967,982 | A | 11/1990 | Bagley | |
| 5,071,087 | A * | 12/1991 | Gray ............................ | 244/3.15 |
| 5,696,347 | A * | 12/1997 | Sebeny et al. ................ | 244/3.15 |
| 5,862,496 | A * | 1/1999 | Biven .......................... | 244/3.15 |
| 6,302,354 | B1 * | 10/2001 | Patera ......................... | 244/3.15 |
| 6,845,938 | B2 * | 1/2005 | Muravez ...................... | 244/3.11 |
| 6,930,633 | B1 | 8/2005 | Epperson | |
| 7,264,198 | B2 * | 9/2007 | Lam ............................ | 244/3.15 |
| 7,394,047 | B1 * | 7/2008 | Pedersen ....................... | 244/3.1 |

(Continued)

OTHER PUBLICATIONS

"International Application Serial No. PCT/US2012/023289, International Search Report mailed Oct. 1, 2012", 2 pgs.

(Continued)

*Primary Examiner* — Bernarr Gregory
(74) *Attorney, Agent, or Firm* — Schwegman Lundberg & Woessner, P.A.

(57) ABSTRACT

A missile guidance system is configured to estimate a time to go, the time to go comprising an amount of time until a missile would reach a closest point of approach to a target. The guidance system is also configured to estimate a zero-effort miss distance along a zero-effort miss vector, the zero-effort miss distance comprising a distance by which the missile would miss the target if the missile performs no future maneuvers. The guidance system is also configured to determine a tolerance for the zero-effort miss distance, the tolerance being a function of the time to go. The guidance system is further configured to modify a course of the missile by adjusting an expenditure of propellant such that the estimated zero-effort miss distance in excess of the tolerance is removed from future consideration.

21 Claims, 3 Drawing Sheets

(56) References Cited

U.S. PATENT DOCUMENTS

| | | | |
|---|---|---|---|
| 7,446,291 B1 * | 11/2008 | Bock | 244/3.1 |
| 7,795,565 B2 | 9/2010 | Bock | |
| 8,378,276 B2 * | 2/2013 | Lam | 244/3.1 |
| 2007/0158492 A1 | 7/2007 | Lam | |
| 2010/0114407 A1 | 5/2010 | Klooster et al. | |
| 2010/0228409 A1 | 9/2010 | Acikmese et al. | |

OTHER PUBLICATIONS

"International Application Serial No. PCT/US2012/023289, Written Opinion mailed Oct. 1, 2012", 5 pgs.

"International Application Serial No. PCT/US2012/023289, International Preliminary Report on Patentability mailed Oct. 10, 2013", 6 pgs.

* cited by examiner

GUIDANCE SYSTEM AND METHOD FOR MISSILE DIVERT MINIMIZATION

GOVERNMENT RIGHTS

This invention was made with government support under contract number HQ00006-04-C-0004. The U.S. Government has certain rights in this invention.

TECHNICAL FIELD

The present invention relates to a system and method for missile divert minimization, that is, minimizing the propellant used in an interceptor missile or other type of missile.

BACKGROUND

Guidance laws for exoatmospheric interceptors are generally based on proportional navigation-like laws such as augmented proportional navigation (APN) or zero effort miss (ZEM) guidance. The APN and ZEM guidance laws are designed to minimize the chance that high accelerations are needed. That is, these guidance laws reduce the chance that the missile will be outmaneuvered, rather than minimizing the total amount of steering that will be used. Along these lines, these proportional navigation-like laws minimize the expected root-mean-square acceleration during the mission, which is equivalent to minimizing the integral of the square of the acceleration, which further minimizes the chances of an interceptor being out maneuvered by a target. However, exoatmospheric interceptors are generally limited more by the total amount of propellant than by their maneuver capability. Thus, these guidance laws do not optimize the odds of a successful interception as they can often result in the interceptor running out of propellant prior to intercept.

DETAILED DESCRIPTION

Figure 1:
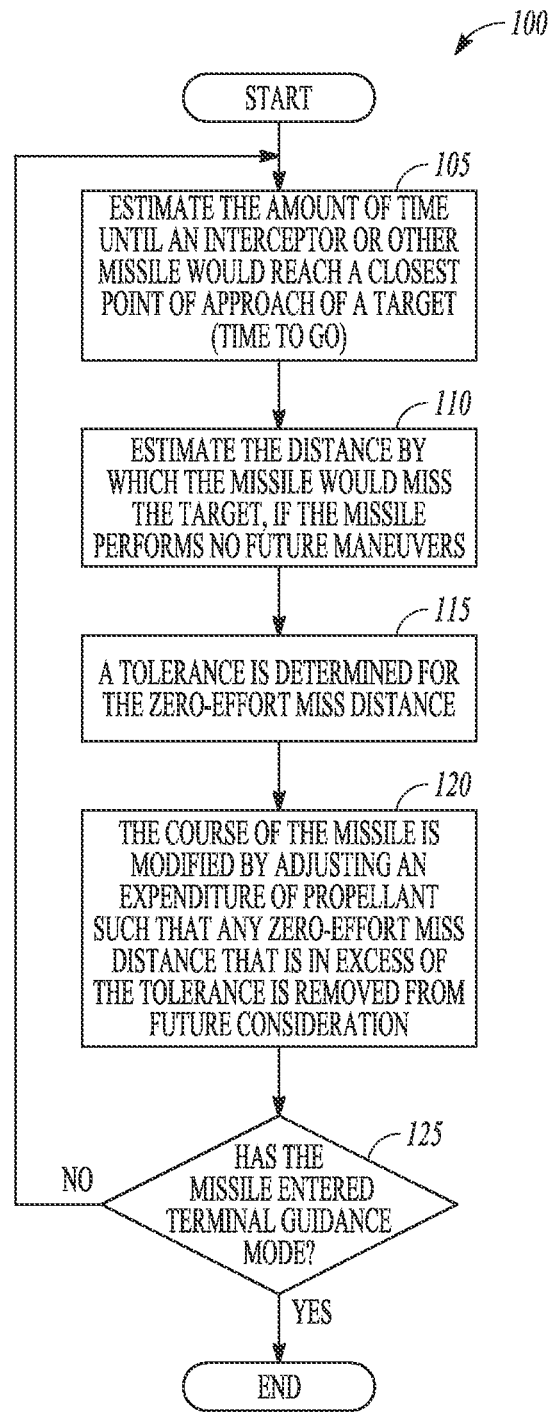
FIG. 1 is a flowchart of an example embodiment of a process of minimizing the diversions of an interceptor missile or other missile.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled.

In the drawings, like numerals refer to the same or similar functionality throughout the several views.

Many exoatmospheric interceptors have a limited propellant supply and consequently can run out of propellant prior to the end of a mission. To address this issue, an embodiment minimizes the expected propellant required for a missile or other interceptor to intercept a target, that is, to reduce the total amount of maneuver of an interceptor during its mission. This minimization of the expected propellant is equivalent to minimizing the integral of the absolute value of the acceleration. The minimization of the amount of propellant that is expected and/or required functions best in pre-terminal situations, that is, wherein the time remaining ("time to go") until expected interception is not very small and is known to a reasonable confidence level.

An embodiment includes a processor and a storage medium that includes a missile or other interceptor guidance algorithm that is designed to minimize the amount of diversion fuel required to intercept a target. A specific embodiment is directed to an exoatmospheric kinetic warhead missile (KW) that has a maneuver plane that is orthogonal to the missile-target line of sight. The algorithm, rather than commanding a maneuver that is proportional to a line of sight rate or zero-effort miss estimate, commands the missile to keep the estimated zero-effort miss distance within limits as a function of the time to go. Consequently, if there is a very large initial estimated zero-effort miss, this initial miss value will be take out quickly rather than slowly, which requires less fuel due to the larger time-to-go when the miss distance is reduced. On the other hand, if there is a very small initial miss (smaller than something of the order unity times the uncertainty in the miss distance prediction), no fuel will be spent because the predicted impact point (PIP) is likely to move by some significant fraction of the current estimate of miss. The exact threshold can be determined numerically, once the characteristics of the system are known. The technique of attempting to keep the zero-effort miss distance bounded by an ever-shrinking window is different from that commonly used in kill vehicle or kinetic warhead (KV/KW) guidance algorithms, which use a proportional navigation-like guidance algorithm.

An optimal guidance law for minimizing propellant usage can be defined by a time-varying threshold, which decreases as time elapses. That is, as noted, an embodiment assumes that the time to go to impact is not very small. Therefore, if a zero effort miss estimate exceeds the threshold, a divert command should be issued so as to reduce the zero effort miss to equal the threshold. It is noted that the exact computation of the threshold depends on how the uncertainty in the zero effort miss estimate changes with time (that is, the standard deviation of the difference between the estimated zero effort miss and the true zero effort miss).

FIG. 1 is a flowchart of an example embodiment of a process 100 for divert minimization. In an embodiment, the divert minimization is applied to an interceptor missile. FIG. 1 includes a number of process blocks 105-125. Though arranged serially in the example of FIG. 3, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIG. 1, the process 100 includes at 105, estimating the amount of time until an interceptor or other missile would reach a closest point of approach of a target. This can be referred to as the "time to go." At 110, the distance by which the missile would miss the target, if the missile performs no future maneuvers, is estimated. This can be referred to as the zero-effort miss distance, and it is determined along a vector from the missile towards the target. This vector can be referred to as the zero-effort miss vector. At 115, a tolerance is determined for the zero-effort miss distance. As explained more fully below, this tolerance is a function of the time to go. At 120, the course of the missile is modified by adjusting an expenditure of propellant such that any zero-effort miss distance that is in excess of the tolerance is removed from future consideration. At decision block 125, it is determined if the missile should enter the terminal guidance mode. If not, the steps in blocks 105 through 120 are repeated.

Figure 2:
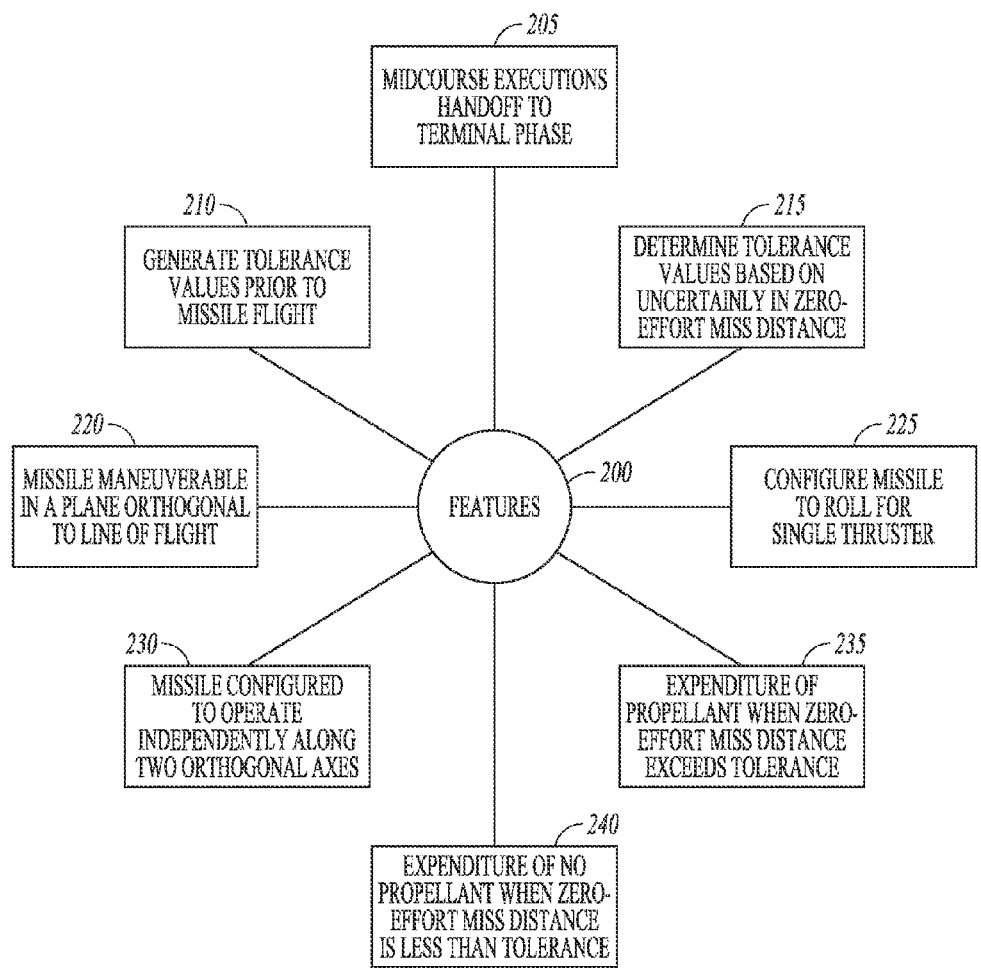
FIG. 2 is a block diagram listing features and functionalities of a system and method to minimize diversions of an interceptor missile or other missile.

FIG. 2 is a diagram illustrating several other features 200 and/or additional details of the process 100. Block 205 indicates that steps 105 through 120 are executed during a midcourse time period of the flight of the missile. This midcourse execution prepares the missile for a terminal phase of the flight of the missile. Block 205 further indicates that when the midcourse time period is complete, the execution of steps 105 through 120 ceases, and the control of the missile is handed off to the terminal phase.

Block 210 indicates that the tolerance values, which are a function of the time to go, are generated prior to a flight of the missile. The tolerance values are determined by the minimization of the integral of the expectation value of the absolute value of the acceleration of the missile during a midcourse phase and a terminal guidance phase of the missile. Block 215 further indicates that the tolerance values are determined as a function of the rate of change over time in the uncertainty in the zero-effort miss distance. In an embodiment, this determination assumes that there are no evasive maneuvers by the target.

Blocks 220, 225, and 230 illustrate several other features of a divert minimization system. At block 220, the missile is configured such that it is capable of maneuvering in a plane orthogonal to a line of sight from the missile to the target. At 225, the missile is configured to roll such that a single thruster points along the zero-effort miss vector. After the single thruster is positioned along the zero-effort miss vector, steps 105 through 120 of FIG. 1 are executed for that single thruster. At 230, the missile is configured such that steps 105 through 120 are executed independently along two orthogonal axes in the maneuver plane of the missile. In an embodiment, blocks 225 and 230 are mutually exclusive.

Blocks 235 and 240 illustrate more details of step 120 of FIG. 1. At 235, the adjustment of the expenditure of propellant is executed when the zero-effort miss distance exceeds the tolerance, and the expenditure of the propellant causes a divert of the missile such that the zero-effort miss distance becomes equal to or less than the tolerance. At 240, the missile expends no propellant when the zero-effort miss distance is less than the tolerance.

The following paragraphs outline in detail the implementation of steps 105-120 and the features of blocks 205-240.

The following variables are defined:

$M_i$ estimated miss distance in the $i^{th}$ time step $\sigma_i$ one sigma change in estimated PIP position between the $i^{th}$ and $i-1^{th}$ time steps $\Delta t$ size of time steps $\Delta v_i$ impulse applied in the $i^{th}$ time step Several caveats are made regarding the following analysis. First, it is assumed that the time-to-go is known sufficiently well that it is not treated as an unknown. For the intended application, this is only true at relatively large time-to-go, when fractional uncertainties in range are small. Second, it is assumed that the divert thrust is applied immediately upon calculation of the desired acceleration. This can be mitigated by propagating the states to the time at which the thrust would be applied (as opposed to propagating to the present time), and computing the acceleration command based on that smaller time-to-go. Third, the derivations do not include any acceleration limit. The effects of acceleration limits on the results are discussed later. Fourth, the derivations below treat zero-effort miss in one dimension only. The effects of this are discussed later.

At the final timestep, all known zero-effort miss should be removed. This requires an impulse equal to the miss distance divided by the time-to-go, or $$\Delta v_1 = \frac{|M_1|}{\Delta t} \qquad 1$$

For the previous time step, some fraction, c, of the zero-effort miss will be removed. Since time-to-go now equals $2\Delta t$, this requires an impulse equal to $$\Delta v_2 = \frac{c|M_2|}{2\Delta t}. \qquad 2$$

Note that it is assumed that c will be between zero and one. In addition to removing some fraction of the miss distance, the miss estimate will change between this time and the final time step due to improvement in the target position estimate. This is a random draw from a Gaussian distribution. This creates a relationship between the miss estimate at this time and the final time step of $$M_1 = (1-c)M_2 + G(0,\sigma_2), \qquad 3$$

where $G(0,\sigma_2)$ is a random Gaussian draw with mean of zero and standard deviation of $\sigma_2$.

Summing the propellant usage in each of the final time steps, the total propellant used equals $$\Delta v_{1,2} = \frac{c|M_2|}{2\Delta t} + \frac{|(1-c)M_2 + G(0,\sigma_2)|}{\Delta t} \qquad 4$$

Because the value of the Gaussian draw is unknown, the expectation value of the total fuel use must be integrated $$\langle \Delta v_{1,2} \rangle = \frac{1}{\sqrt{2\pi\sigma_2^2}} \int_{-\infty}^{\infty} e^{-\frac{x^2}{2\sigma_2^2}} \left( \frac{c|M_2|}{2\Delta t} + \frac{|(1-c)M_2 + x|}{\Delta t} \right) dx, \qquad 5$$

which reduces to $$\langle \Delta v_{1,2} \rangle = \frac{c|M_2|}{2\Delta t} + \frac{2\sigma_2}{\sqrt{2\pi}\Delta t} e^{-\frac{((1-c)M_2)^2}{2\sigma_2^2}} + \qquad 6$$

-continued $$\frac{(1-c)M_2}{\Delta t}\left(1 - \frac{2}{\sqrt{2\pi\sigma_2^2}}\int_{-\infty}^{-(1-c)M_2} e^{-\frac{x^2}{2\sigma_2^2}}dx\right).$$

The derivation for Equation 6 is outlined below.

The value of c is now determined that will minimize the expected propellant usage. This is done by setting the derivative equal to zero.

$$0 = \frac{|M_2|}{2\Delta t} + \frac{2\sigma_2}{\sqrt{2\pi}\,\Delta t}\frac{d}{dc}\left(e^{-\frac{((1-c)M_2)^2}{2\sigma_2^2}}\right) + \tag{7}$$

$$\frac{d}{dc}\left[\frac{(1-c)M_2}{\Delta t}\left(1 - \frac{2}{\sqrt{2\pi\sigma_2^2}}\int_{-\infty}^{-(1-c)M_2} e^{-\frac{x^2}{2\sigma_2^2}}dx\right)\right],$$

which reduces to $$0 = \frac{|M_2|}{2M} - M_2 + \frac{2M_2}{\sqrt{2\pi\sigma_2^2}}\int_{-\infty}^{-(1-c)M_2} e^{-\frac{x^2}{2\sigma_2^2}}dx. \tag{8}$$

Solving for c, one gets $$c = \begin{cases} 1 + \frac{0.67449\sigma_2}{M_2}, & M_2 < -0.67449\sigma_2 \\ 0, & -0.67449\sigma_2 < M_2 < 0.67449\sigma_2 \\ 1 - \frac{0.67449\sigma_2}{M_2}, & M_2 > 0.67449\sigma_2 \end{cases} \tag{9}$$

Recalling that c is the fraction of miss estimate to remove in this particular step, this is clearly not a proportional navigation sort of guidance law, in which the acceleration is a fixed fraction of the miss distance. Instead, it is useful to examine the solution in terms of $(1-c)M_2$, which is the amount of estimated miss distance that is not removed. Solving for this, Equation 9 becomes $$(1-c)M_2 = \begin{cases} -0.67449\sigma_2, & M_2 < -0.67449\sigma_2 \\ M_2, & -0.67449\sigma_2 < M_2 < 0.67449\sigma_2 \\ 0.67449\sigma_2, & M_2 > 0.67449\sigma_2 \end{cases} \tag{10}$$

That is, if the estimated miss at the point of closest approach exceeds $0.67449\,\sigma_2$, a maneuver will be used to reduce the miss estimate to that value. If not, no maneuver is made. It should be noted that $\pm 0.67449\,\sigma_2$ are the $25^{th}$ and $75^{th}$ percentile points on a Gaussian distribution with mean zero and standard deviation of $\sigma_2$. Putting this solution into Equation 6, an overall expectation value of the total divert is obtained over the final two steps and is equal to $$\langle \Delta v_{1,2} \rangle = \tag{11}$$

$$\begin{cases} \frac{-M_2}{2\Delta t} + \frac{0.635553\sigma_2}{\Delta t}, & M_2 < -0.67449\sigma_2 \\ \frac{2\sigma_2}{\sqrt{2\pi}\,\Delta t}e^{-\frac{M_2^2}{2\sigma_2^2}} + \frac{M_2}{\Delta t}\left(1 - \frac{2}{\sqrt{2\pi\sigma_2^2}}\int_{-\infty}^{-M_2} e^{-\frac{x^2}{2\sigma_2^2}}dx\right), & -0.67449\sigma_2 < M_2 < 0.67449\sigma_2 \\ \frac{M_2}{2\Delta t} + \frac{0.635553\sigma_2}{\Delta t}, & M_2 > 0.67449\sigma_2 \end{cases}$$

The variable c is now defined as the fraction of the ZEM to remove in the third-to-last time step. Since time-to-go now equals $3\Delta t$, this requires an impulse equal to $$\Delta v_3 = \frac{c|M_3|}{3\Delta t}. \tag{12}$$

This creates a relationship between the miss estimate at this time and the next time step of $$M_2 = (1-C)M_3 + G(0,\sigma_3), \tag{13}$$

where G again designates a random Gaussian draw, this time with mean zero and standard deviation of $\sigma_3$.

Summing the propellant usage in each of the final time steps, the total propellant used equals $$\Delta v_{1,2,3} = \frac{c|M_3|}{3\Delta t} + \langle \Delta v_{1,2}((1-c)M_3 + G)\rangle, \tag{14}$$

Where the function $\Delta v_{1,2}(\,)$ is the result of Equation 11. This creates an expectation value of the total propellant usage equal to $$\langle \Delta v_{1,2,3}\rangle = \frac{1}{\sqrt{2\pi\sigma_3^2}}\int_{-\infty}^{\infty} e^{-\frac{x^2}{2\sigma_3^2}}\left(\frac{c|M_3|}{3\Delta t} + \langle \Delta v_{1,2}((1-c)M_3 + x)\rangle\right)dx, \tag{15}$$

which reduces to $$\langle \Delta v_{1,2,3}\rangle = \tag{16}$$

$$\frac{c|M_3|}{3\Delta t} + \frac{1}{\sqrt{2\pi\sigma_3^2}}\int_{-\infty}^{-0.67449\sigma_2-(1-c)M_3} e^{-\frac{x^2}{2\sigma_3^2}}\left(\frac{-(1-c)M_3}{2\Delta t} - \frac{x}{2\Delta t} + \frac{0.635553\sigma_2}{\Delta t}\right)dx +$$

$$\frac{1}{\sqrt{2\pi\sigma_3^2}}\int_{-0.67449\sigma_2-(1-c)M_3}^{0.67449\sigma_2-(1-c)M_3} e^{-\frac{x^2}{2\sigma_3^2}}\left[\frac{\frac{\sqrt{2}\sigma_2}{\sqrt{\pi}\,\Delta t}e^{-\frac{((1-c)M_3+x)^2}{2\sigma_2^2}} + \frac{(1-c)M_3+x}{\Delta t}}{\left(1 - \frac{2}{\sqrt{2\pi\sigma_2^2}}\int_{y=-\infty}^{-(1-c)M_3-x} e^{-\frac{y^2}{2\sigma_2^2}}dy\right)}\right]dx +$$

$$\frac{1}{\sqrt{2\pi\sigma_3^2}}\int_{0.67449\sigma_2-(1-c)M_3}^{\infty} e^{-\frac{x^2}{2\sigma_3^2}}\left(\frac{(1-c)M_3}{2\Delta t} + \right.$$

-continued $$\left. \frac{x}{2\Delta t} + \frac{0.635553\sigma_2}{\Delta t} \right) dx$$

The value of c that will minimize the expected propellant usage is now determined. This is done by setting the derivative equal to zero.

$$0 = \frac{|M_3|}{3\Delta t} + \qquad\qquad 17$$

$$\frac{1}{\sqrt{2\pi\sigma_3^2}} \frac{d}{dc} \left[ \int_{-\infty}^{-0.67449\sigma_2-(1-c)M_3} e^{-\frac{x^2}{2\sigma_3^2}} \left( \frac{-(1-c)M_3}{2\Delta t} - \frac{x}{2\Delta t} + \frac{0.635553\sigma_2}{\Delta t} \right) dx \right] +$$

$$\frac{1}{\sqrt{2\pi\sigma_3^2}} \frac{d}{dc}$$

$$\left\{ \int_{-0.67449\sigma_2-(1-c)M_3}^{0.67449\sigma_2-(1-c)M_3} e^{-\frac{x^2}{2\sigma_3^2}} \left[ \frac{\sqrt{2}}{\sqrt{\pi}} \frac{\sigma_2}{\Delta t} e^{-\frac{((1-c)M_3+x)^2}{2\sigma_2^2}} + \frac{(1-c)M_3+x}{\Delta t} \left( 1 - \frac{2}{\sqrt{2\pi\sigma_2^2}} \int_{y=-\infty}^{-(1-c)M_3-x} e^{-\frac{y^2}{2\sigma_2^2}} dy \right) \right] dx \right\} +$$

$$\frac{1}{\sqrt{2\pi\sigma_3^2}} \frac{d}{dc} \left[ \int_{0.67449\sigma_2-(1-c)M_3}^{\infty} e^{-\frac{x^2}{2\sigma_3^2}} \left( \frac{(1-c)M_3}{2\Delta t} + \frac{x}{2\Delta t} + \frac{0.635553\sigma_2}{\Delta t} \right) dx \right],$$

which reduces to $$0 = \frac{|M_3|}{3M_3} - \frac{1}{2} + \frac{1}{\sqrt{2\pi}} \int_{u=-\infty}^{-0.67449\frac{\sigma_2}{\sigma_3}} e^{-\frac{1}{2}\left(u-\frac{(1-c)M_3}{\sigma_3}\right)^2} du + \qquad 18$$

$$\sqrt{\frac{2}{\pi}} \int_{u=-0.67449\frac{\sigma_2}{\sigma_3}}^{0.67449\frac{\sigma_2}{\sigma_3}} e^{-\frac{1}{2}\left(u-\frac{(1-c)M_3}{\sigma_3}\right)^2} \left( \frac{3}{4} - \frac{1}{\sqrt{2\pi}} \int_{v=-\infty}^{\frac{\sigma_3}{\sigma_2}u} e^{-\frac{v^2}{2}} dv \right) du.$$

Solving this for c requires a numerical solution. However, c exists only in the term $(1-c)M_3$, which as before is the amount of estimated miss distance to leave after the KV maneuver. Furthermore, note that the variables in Equation 18 appear in the forms $(1-c)M_3/\sigma_3$, $\sigma_2/\sigma_3$, and the sign of $M_3$. This indicates that the amount of miss distance to leave after the maneuver will equal $\sigma_3$ multiplied by some function of the ratio $\sigma_2/\sigma_3$.

Beyond the third time step, the mathematics becomes such that a straightforward derivation is no longer possible. Thus, the simple case is examined first, where $\sigma_i$ is much larger than $\sigma_{i-1}$, $\sigma_{i-2}$, and so on. This will be derived by recursion. Suppose that the expected propellant usage through step i, where i=1 is the final step and i increases with time to go, can be represented as $$\langle \Delta v_{1...i} \rangle = \frac{|M_i|}{i\Delta t} + C_i, \qquad\qquad 19$$

where C is a constant, as is the case in Equation 11. Making the appropriate substitutions from Equations 12-15, the expected fuel usage through the previous step i+1 equals $$\langle \Delta v_{1...i+1} \rangle = \frac{c|M_{i+1}|}{(i+1)\Delta t} + \qquad 20$$

$$\frac{1}{\sqrt{2\pi\sigma_{i+1}^2}} \int_{-\infty}^{-(1-c)M_{i+1}} e^{-\frac{x^2}{2\sigma_{i+1}^2}} \left( \frac{-(1-c)M_{i+1}}{i\Delta t} - \frac{x}{i\Delta t} + C_i \right) dx +$$

$$\frac{1}{\sqrt{2\pi\sigma_{i+1}^2}} \int_{-(1-c)M_{i+1}}^{\infty} e^{-\frac{x^2}{2\sigma_{i+1}^2}} \left( \frac{(1-c)M_{i+1}}{i\Delta t} + \frac{x}{i\Delta t} + C_i \right) dx,$$

which reduces to $$\langle \Delta v_{1...i+1} \rangle = \frac{c|M_{i+1}|}{(i+1)\Delta t} + \frac{(1-c)M_{i+1}}{i\Delta t} + \frac{2\sigma_{i+1}}{\sqrt{2\pi}\, i\Delta t} e^{-\frac{((1-c)M_{i+1})^2}{2\sigma_{i+1}^2}} + \qquad 21$$

$$C_i - \frac{2(1-c)M_{i+1}}{\sqrt{2\pi\sigma_{i+1}^2}\, i\Delta t} \int_{-\infty}^{-(1-c)M_{i+1}} e^{-\frac{x^2}{2\sigma_{i+1}^2}} dx.$$

Again, we solve for c by setting the derivative equal to zero. This reduces to $$\frac{1}{\sqrt{2\pi\sigma_{i+1}^2}} \int_{-\infty}^{(1-c)M_{i+1}} e^{-\frac{x^2}{2\sigma_{i+1}^2}} dx = \frac{1}{2} + \frac{i\,\text{sign}(M_{i+1})}{2(i+1)}. \qquad 22$$

Put into words, the amount of miss distance to leave after the $i^{th}$ time step, $(1-c)M_i$, will equal the $\frac{1}{2}i$ and $1-(\frac{1}{2}i)$ percentiles of the distribution with standard deviation of $\sigma_i$.

Substituting into Equation 21, the expected propellant usage equals $$\langle \Delta v_{1...i+1} \rangle = \frac{|M_{i+1}|}{(i+1)\Delta t} + \frac{2\sigma_{i+1}}{\sqrt{2\pi}\, i\Delta t} e^{-\frac{((1-c)M_{i+1})^2}{2\sigma_{i+1}^2}} + C_i, \qquad 23$$

which for the purposes of optimizing the next time step reduces to:

$$\langle \Delta v_{1...i+1} \rangle = \frac{|M_{i+1}|}{(i+1)\Delta t} + C_{i+1}. \qquad 24$$

Comparing Equations 19 and 24, the recursive relationship is established.

From what has been learned thus far, it is suggested that the miss distance to leave in the $i^{th}$ time step can be written as $$M_i = \sigma_i f\!\left( i, \frac{\sigma_2}{\sigma_1}, \frac{\sigma_3}{\sigma_1}, \frac{\sigma_4}{\sigma_1}, \ldots \right), \qquad 25$$

Where $\sigma_i$ is the typical change in estimated target position at intercept between steps i and i−1, and $f$ is an arbitrary function of time step number and the functional form of $\sigma_i$. Defining $\sigma_{PIP}(t_{go})$ as the uncertainty in intercept position at a time-to-go $t_{go}$, it is noted that, because the target estimate is a continuously improving process, the predicted target position at intercept at step i should equal the predicted target position at intercept during step i−1, plus some random motion.

$$\sigma_{PIP}^2(i\Delta t) = \sigma_{PIP}((i-1)\Delta t) + \sigma_i^2. \qquad 26$$

Using this relation and rewriting i as a function of $t_{go}$ and time step size $\Delta t$, Equation 25 can be rewritten as $$M(t_{go}) = \sqrt{\sigma_{PIP}^2(t_{go}) - \sigma_{PIP}^2(t_{go} - \Delta t)} \, f\left(\frac{t_{go}}{\Delta t}, \sigma_{PIP}(t)\right). \qquad 27$$

In the limit where $\Delta t$ is small (or at least, the derivative of $\sigma_{PIP}(t_{go})$ does not significantly change over a time step), this becomes $$M(t_{go}) = \sqrt{\Delta t \frac{d\sigma_{PIP}^2(t_{go})}{dt_{go}}} \, f\left(\frac{t_{go}}{\Delta t}, \sigma_{PIP}(t)\right). \qquad 28$$

It is further noted that $M(t_{go})$ should not be a function of the time step size in the case where $t_{go}$ is much greater than $\Delta t$. Were this the case, the guidance law would behave very differently for time step sizes of, say, 0.001 seconds and 0.002 seconds at a time-to-go of 100 seconds. In order to ensure that $M(t_{go})$ is not a function of $\Delta t$, it is necessary to rewrite the function $f$ as $$f\left(\frac{t_{go}}{\Delta t}, \sigma_{PIP}(t)\right) = \sqrt{\frac{t_{go}}{\Delta t}} \, g(\sigma_{PIP}(t)), \qquad 29$$

where g is a function of the shape of the uncertainty curve for the target position at intercept. This functional form will cause the terms of $\Delta t$ to cancel when multiplied. Also, note that for any particular function $\sigma_{PIP}(t_{go})$, g will be a constant and thus we can write the miss distance to leave as $$M(t_{go}) = C \sqrt{t_{go} \frac{d\sigma_{PIP}^2(t_{go})}{dt_{go}}} . \qquad 30$$

The following section will demonstrate the accuracy of this form, as well as identifying the constant C for some different forms of $\sigma_{PIP}(t_{go})$.

From the previous section, it is apparent that it becomes extremely cumbersome to exactly determine the miss distance threshold over any significant number of time steps. Instead of computing a functional representation of the total divert, a minimization of a Monte Carlo run set can be made instead. First, a Monte Carlo set of runs is generated for a particular PIP uncertainty profile $\sigma(t_{go})$, and over a particular number of time steps. For this analysis, a PIP uncertainty is used that can be characterized as $$\sigma_{PIP}(t_{go}) = k t_{go}^p, \qquad 31$$

where k and p are constants. It should be emphasized that if the PIP uncertainty is characterized differently, the following analysis should be repeated with the appropriate function. A function returning the average total divert over the Monte Carlo set for any specific set of miss distance thresholds is then minimized to determine the miss distance thresholds that minimize the expected total divert.

Substituting the form of $\sigma_{PIP}$ in Equation 34 into the miss threshold formula in Equation 30, the threshold can be written as $$M(t_{go}) = C k \sqrt{p} \, t_{go}^p = h(p) \sigma_{PIP}(t_{go}), \qquad 32$$

where h(p) is another arbitrary function, this time only of the power. Put into words, if the PIP uncertainty is a power law function of time-to-go, the miss threshold will be proportional to the PIP uncertainty, where the ratio of the two is a function only of the power law slope. Once the time-to-go is sufficiently large (more than about 30 time steps), the ratios become constant.

The preceding analysis is made with the assumption that the KV has an infinite acceleration capacity. That is, it could remove as much miss as desired in any given time step. For a realistic system, however, this is not the case. By modifying the optimization algorithm from above, application of a maximum acceleration has no effect at all on the guidance law (though the expected propellant usage is increased). The other outstanding issue is that the preceding analysis is made with a miss distance in only one direction. For a real engagement, the miss vector at point of closest approach will be in a plane normal to the relative velocity vector at intercept. Depending on the kinetic vehicle roll constraints, the second miss axis will have a different effect.

For this discussion, it is assumed that the KV divert thrusters are aligned along the body Y and Z axes, and that the body X axis is pointing towards the target. If the KV roll angle must remain constant, the guidance law can be isolated between the Y and Z axes. The PIP uncertainty, $\sigma_{PIP}$, will refer to only one dimension of the uncertainty (i.e., it will be the root sum of squares (RSS) PIP uncertainty divided by $\sqrt{2}$). The miss threshold is then applied independently to the miss distance in each maneuver axis, and divert commanded if the single-axis miss distance exceeds the threshold. If there are no constraints on the KV's roll angle, the PIP uncertainty, $\sigma_{PIP}$, will refer to the magnitude of the uncertainty of the target position at intercept in the Y-Z plane. This is used to compute the miss threshold, which is compared against the estimated miss distance at point of closest approach. If the estimated miss distance exceeds the threshold, the KV should be commanded to roll such that a thruster points along the direction of the miss vector. Once this is complete, a divert maneuver will be used to remove the excess miss distance. The factor of $\sqrt{2}$ relationship between the thresholds for these two cases has been verified by modifying the optimization code used above for two dimensions. Due to a non-zero roll response time, the propellant used to execute the roll maneuver, and the effect on the tracker, the frequency of roll maneuvers should be limited.

In the following derivations, several identities are commonly used. First is the definite integral of a Gaussian probability distribution.

$$\frac{1}{\sqrt{2\pi\sigma^2}} \int_{-\infty}^{\infty} e^{-\frac{x^2}{2\sigma^2}} dx = 1$$

Because the mean-zero Gaussian is symmetric around x=0, it follows that $$\int_{-\infty}^{x} e^{-\frac{x^2}{2\sigma^2}} dx + \int_{x}^{\infty} e^{-\frac{x^2}{2\sigma^2}} dx = \sqrt{2\pi\sigma^2}$$

$$\int_{-\infty}^{x} e^{-\frac{x^2}{2\sigma^2}} dx = \sqrt{2\pi\sigma^2} - \int_{-\infty}^{-x} e^{-\frac{x^2}{2\sigma^2}} dx$$

The second identity is the indefinite integral of the first moment of the Gaussian probability distribution, which is integrated by substitution.

Let $u = \frac{x^2}{2\sigma^2}$ $\sigma^2 du = x\, dx$ $$\frac{1}{\sqrt{2\pi\sigma^2}} \int xe^{-\frac{x^2}{2\sigma^2}} dx =$$

$$\frac{\sigma^2}{\sqrt{2\pi\sigma^2}} \int e^{-u} du = \frac{-\sigma}{\sqrt{2\pi}} e^{-u} + C = \frac{-\sigma}{\sqrt{2\pi}} e^{-\frac{x^2}{2\sigma^2}} + C$$

Next is the following derivative, which is differentiated by parts.

$$\frac{d}{dc} \left( e^{-\frac{(1-c)^2 M^2}{2\sigma^2}} \right) =$$

$$e^{-\frac{(1-c)^2 M^2}{2\sigma^2}} \frac{d}{dc}\left(-\frac{(1-2c+c^2)M^2}{2\sigma^2}\right) = e^{-\frac{(1-c)^2 M^2}{2\sigma^2}} \left(-\frac{M^2}{2\sigma^2}(2c-2)\right)$$

$$\frac{d}{dc}\left(e^{-\frac{(1-c)^2 M^2}{2\sigma^2}}\right) = \frac{(1-c)M^2}{\sigma^2} e^{-\frac{(1-c)^2 M^2}{2\sigma^2}}.$$

Finally is the derivative of the cumulative normal distribution $u = -(1-c)M = cM - M$ $$\frac{d}{dc}\left( \frac{1}{\sqrt{2\pi\sigma^2}} \int_{-\infty}^{-(1-c)M} e^{-\frac{x^2}{2\sigma^2}} dx \right) =$$

$$\frac{1}{\sqrt{2\pi\sigma^2}} \frac{d}{du}\left(\int_{-\infty}^{u} e^{-\frac{x^2}{2\sigma^2}} dx\right)\frac{du}{dc} = \frac{1}{\sqrt{2\pi\sigma^2}} e^{-\frac{u^2}{2\sigma^2}} M$$

$$\frac{d}{dc}\left( \frac{1}{\sqrt{2\pi\sigma^2}} \int_{-\infty}^{-(1-c)M} e^{-\frac{x^2}{2\sigma^2}} dx \right) = \frac{M}{\sqrt{2\pi\sigma^2}} e^{-\frac{(1-c)^2 M^2}{2\sigma^2}}$$

The following is the derivation for Equation 6.

$$\langle \Delta v_{1,2} \rangle = \frac{1}{\sqrt{2\pi\sigma_2^2}} \int_{-\infty}^{\infty} e^{-\frac{x^2}{2\sigma_2^2}} \left( \frac{c|M_2|}{2\Delta t} + \frac{|(1-c)M_2 + x|}{\Delta t} \right) dx$$

$$= \frac{c|M_2|}{2\Delta t} \frac{1}{\sqrt{2\pi\sigma_2^2}} \int_{-\infty}^{\infty} e^{-\frac{x^2}{2\sigma_2^2}} dx +$$

$$\frac{1}{\sqrt{2\pi\sigma_2^2}} \int_{-\infty}^{\infty} e^{-\frac{x^2}{2\sigma_2^2}} \frac{|(1-c)M_2 + x|}{\Delta t} dx$$

$$= \frac{c|M_2|}{2\Delta t} - \frac{1}{\sqrt{2\pi\sigma_2^2}} \int_{-\infty}^{-(1-c)M_2} e^{-\frac{x^2}{2\sigma_2^2}} \frac{(1-c)M_2 + x}{\Delta t} dx +$$

$$\frac{1}{\sqrt{2\pi\sigma_2^2}} \int_{-(1-c)M_2}^{\infty} e^{-\frac{x^2}{2\sigma_2^2}} \frac{(1-c)M_2 + x}{\Delta t} dx$$

$$= \frac{c|M_2|}{2\Delta t} - \frac{1}{\sqrt{2\pi\sigma_2^2}} \frac{(1-c)M_2}{\Delta t} \int_{-\infty}^{-(1-c)M_2} e^{-\frac{x^2}{2\sigma_2^2}} dx -$$

$$\frac{1}{\sqrt{2\pi\sigma_2^2}\,\Delta t} \int_{-\infty}^{-(1-c)M_2} xe^{-\frac{x^2}{2\sigma_2^2}} dx -$$

$$\frac{1}{\sqrt{2\pi\sigma_2^2}} \frac{(1-c)M_2}{\Delta t} \int_{-\infty}^{-(1-c)M_2} e^{-\frac{x^2}{2\sigma_2^2}} dx +$$

$$\frac{1}{\sqrt{2\pi\sigma_2^2}} \frac{(1-c)M_2}{\Delta t} \int_{-\infty}^{\infty} e^{-\frac{x^2}{2\sigma_2^2}} dx +$$

$$\frac{1}{\sqrt{2\pi\sigma_2^2}\,\Delta t} \int_{-(1-c)M_2}^{\infty} xe^{-\frac{x^2}{2\sigma_2^2}} dx$$

$$= \frac{c|M_2|}{2\Delta t} - \frac{2}{\sqrt{2\pi\sigma_2^2}} \frac{(1-c)M_2}{\Delta t} \int_{-\infty}^{-(1-c)M_2} e^{-\frac{x^2}{2\sigma_2^2}} dx +$$

$$\frac{1}{\sqrt{2\pi\sigma_2^2}\,\Delta t} \left(\sigma_2^2 e^{-\frac{x^2}{2\sigma_2^2}}\right)\Bigg|_{-\infty}^{-(1-c)M_2} + \frac{(1-c)M_2}{\Delta t} -$$

$$\frac{1}{\sqrt{2\pi\sigma_2^2}\,\Delta t} \left(\sigma_2^2 e^{-\frac{x^2}{2\sigma_2^2}}\right)\Bigg|_{-(1-c)M_2}^{\infty}$$

$$= \frac{c|M_2|}{2\Delta t} - \frac{2}{\sqrt{2\pi\sigma_2^2}} \frac{(1-c)M_2}{\Delta t} \int_{-\infty}^{-(1-c)M_2} e^{-\frac{x^2}{2\sigma_2^2}} dx -$$

$$\frac{\sigma_2}{\sqrt{2\pi}\,\Delta t} e^{-\frac{((1-c)M_2)^2}{2\sigma_2^2}} + \frac{(1-c)M_2}{\Delta t} - \frac{\sigma_2}{\sqrt{2\pi}\,\Delta t} e^{-\frac{((1-c)M_2)^2}{2\sigma_2^2}}$$

$$= \frac{c|M_2|}{2\Delta t} - \frac{2\sigma_2}{\sqrt{2\pi}\,\Delta t} e^{-\frac{((1-c)M_2)^2}{2\sigma_2^2}} +$$

$$\frac{(1-c)M_2}{\Delta t}\left(1 - \frac{2}{\sqrt{2\pi\sigma_2^2}} \int_{-\infty}^{-(1-c)M_2} e^{-\frac{x^2}{2\sigma_2^2}} dx\right)$$

The following is the derivation for Equation 8.

$$0 = \frac{|M_2|}{2\Delta t} + \frac{2\sigma_2}{\sqrt{2\pi}\,\Delta t} \frac{d}{dc}\left(e^{-\frac{((1-c)M_2)^2}{2\sigma_2^2}}\right) +$$

$$\frac{d}{dc}\left[\frac{(1-c)M_2}{\Delta t}\left(1 - \frac{2}{\sqrt{2\pi\sigma_2^2}} \int_{-\infty}^{-(1-c)M_2} e^{-\frac{x^2}{2\sigma_2^2}} dx\right)\right]$$

-continued $$0 = \frac{|M_2|}{2\Delta t} + \frac{2\sigma_2}{\sqrt{2\pi}} \frac{(1-c)M_2^2}{\sigma_2^2} e^{-\frac{(1-c)M_2^2}{2\sigma_2^2}} + M_2 \frac{d}{dc}(1-c) -$$

$$2M_2 \frac{d}{dc}\left(\frac{1-c}{\sqrt{2\pi\sigma_2^2}} \int_{-\infty}^{-(1-c)M_2} e^{-\frac{x^2}{2\sigma_2^2}} dx\right)$$

$$0 = \frac{|M_2|}{2\Delta t} + \frac{2(1-c)M_2^2}{\sqrt{2\pi}\,\sigma_2} e^{-\frac{(1-c)M_2^2}{2\sigma_2^2}} - M_2 -$$

$$\frac{2M_2}{\sqrt{2\pi\sigma_2^2}} \int_{-\infty}^{-(1-c)M_2} e^{-\frac{x^2}{2\sigma_2^2}} dx \frac{d}{dc}(1-c) -$$

$$2M_2(1-c) \frac{d}{dc}\left(\frac{1}{\sqrt{2\pi\sigma_2^2}} \int_{-\infty}^{-(1-c)M_2} e^{-\frac{x^2}{2\sigma_2^2}} dx\right)$$

$$0 = \frac{|M_2|}{2} - M_2 + \frac{2(1-c)M_2^2}{\sqrt{2\pi}\,\sigma_2} e^{-\frac{(1-c)M_2^2}{2\sigma_2^2}} +$$

$$\frac{2M_2}{\sqrt{2\pi\sigma_2^2}} \int_{-\infty}^{-(1-c)M_2} e^{-\frac{x^2}{2\sigma_2^2}} dx - 2M_2(1-c) \frac{M_2}{\sqrt{2\pi\sigma_2^2}} e^{-\frac{(1-c)^2 M_2^2}{2\sigma_2^2}}$$

Noting that the third and fifth terms of the sum cancel, this becomes $$0 = \frac{|M_2|}{2} - M_2 + \frac{2M_2}{\sqrt{2\pi\sigma_2^2}} \int_{-\infty}^{-(1-c)M_2} e^{-\frac{x^2}{2\sigma_2^2}} dx.$$

The following is the derivation for Equation 9.

$$0 = \frac{|M_2|}{2} - M_2 + \frac{2M_2}{\sqrt{2\pi\sigma_2^2}} \int_{-\infty}^{-(1-c)M_2} e^{-\frac{x^2}{2\sigma_2^2}} dx$$

$$0 = \begin{cases} \frac{-M_2}{2} - M_2 + \frac{2M_2}{\sqrt{2\pi\sigma_2^2}} \int_{-\infty}^{-(1-c)M_2} e^{-\frac{x^2}{2\sigma_2^2}} dx = \frac{-3M_2}{2} + \frac{2M_2}{\sqrt{2\pi\sigma_2^2}} \int_{-\infty}^{-(1-c)M_2} e^{-\frac{x^2}{2\sigma_2^2}} dx, & M_2 < 0 \\ \frac{M_2}{2} - M_2 + \frac{2M_2}{\sqrt{2\pi\sigma_2^2}} \int_{-\infty}^{-(1-c)M_2} e^{-\frac{x^2}{2\sigma_2^2}} dx = \frac{-M_2}{2} + \frac{2M_2}{\sqrt{2\pi\sigma_2^2}} \int_{-\infty}^{-(1-c)M_2} e^{-\frac{x^2}{2\sigma_2^2}} dx, & M_2 > 0 \end{cases}$$

$$\frac{2M_2}{\sqrt{2\pi\sigma_2^2}} \int_{-\infty}^{-(1-c)M_2} e^{-\frac{x^2}{2\sigma_2^2}} dx = \begin{cases} \frac{3M_2}{2}, & M_2 < 0 \\ \frac{M_2}{2}, & M_2 < 0 \end{cases}$$

$$\frac{1}{\sqrt{2\pi\sigma_2^2}} \int_{-\infty}^{-(1-c)M_2} e^{-\frac{x^2}{2\sigma_2^2}} dx = \begin{cases} \frac{3}{4}, & M_2 < 0 \\ \frac{1}{4}, & M_2 < 0 \end{cases}$$

Noting that the left hand side is simply a cumulative probability distribution of a Gaussian with mean zero and standard deviation of $\sigma_2$, this can be solved as:

$$-(1-c)M_2 = \begin{cases} 0.67449\sigma_2, & M_2 < 0 \\ -0.67449\sigma_2, & M_2 > 0 \end{cases}$$

$$c = \begin{cases} 1 + \frac{0.67449\sigma_2}{M_2}, & M_2 < 0 \\ 1 - \frac{0.67449\sigma_2}{M_2}, & M_2 > 0 \end{cases}$$

Finally, applying the constraint that $0 < c < 1$, the solution is $$c = \begin{cases} 1 + \frac{0.67449\sigma_2}{M_2}, & M_2 < 0 \\ 0, & -0.67449\sigma_2 < M_2 < 0.67449\sigma_2 \\ 1 - \frac{0.67449\sigma_2}{M_2}, & M_2 > 0 \end{cases}$$

The following is the derivation of Equation 11.
Using the solution for c, $$c = \begin{cases} 1 + \frac{0.67449\sigma_2}{M_2}, & M_2 < -0.67449\sigma_2 \\ 0, & -0.67449\sigma_2 < M_2 < 0.67449\sigma_2 \\ 1 - \frac{0.67449\sigma_2}{M_2}, & M_2 > 0.67449\sigma_2 \end{cases}$$

The general form of the expected total divert (Equation 6) becomes:

$$\langle \Delta v_{1,2} \rangle = \frac{c|M_2|}{2\Delta t} + \frac{2\sigma_2}{\sqrt{2\pi}\,\Delta t} e^{-\frac{((1-c)M_2)^2}{2\sigma_2^2}} + \frac{(1-c)M_2}{\Delta t}\left(1 - \frac{2}{\sqrt{2\pi\sigma_2^2}} \int_{-\infty}^{-(1-c)M_2} e^{-\frac{x^2}{2\sigma_2^2}} dx\right)$$

$$= \begin{cases} \dfrac{\left(1 + \dfrac{0.67449\sigma_2}{M_2}\right)(-M_2)}{2\Delta t} + \dfrac{2\sigma_2}{\sqrt{2\pi}\,\Delta t}e^{-\frac{(0.67449\sigma_2)^2}{2\sigma_2^2}} - \dfrac{0.67449\sigma_2}{\Delta t}\left(1 - \dfrac{2}{\sqrt{2\pi\sigma_2^2}}\int_{-\infty}^{0.67449\sigma_2}e^{-\frac{x^2}{2\sigma_2^2}}dx\right), & M_2 < -0.67449\sigma_2 \\[1em] 0 + \dfrac{2\sigma_2}{\sqrt{2\pi}\,\Delta t}e^{-\frac{(M_2)^2}{2\sigma_2^2}} + \dfrac{M_2}{\Delta t}\left(1 - \dfrac{2}{\sqrt{2\pi\sigma_2^2}}\int_{-\infty}^{-M_2}e^{-\frac{x^2}{2\sigma_2^2}}dx\right), & -0.67449\sigma_2 < M_2 < 0.67449\sigma_2 \\[1em] \dfrac{\left(1 - \dfrac{0.67449\sigma_2}{M_2}\right)M_2}{2\Delta t} + \dfrac{2\sigma_2}{\sqrt{2\pi}\,\Delta t}e^{-\frac{(0.67449\sigma_2)^2}{2\sigma_2^2}} + \dfrac{0.67449\sigma_2}{\Delta t}\left(1 - \dfrac{2}{\sqrt{2\pi\sigma_2^2}}\int_{-\infty}^{-0.67449\sigma_2}e^{-\frac{x^2}{2\sigma_2^2}}dx\right), & M_2 > 0.67449\sigma_2 \end{cases}$$

$$= \begin{cases} \dfrac{-M_2 - 0.67449\sigma_2}{2\Delta t} + \dfrac{2\sigma_2}{\sqrt{2\pi}\,\Delta t}e^{-\frac{0.67449^2}{2}} - \dfrac{0.67449\sigma_2}{\Delta t}\left(-\dfrac{1}{2}\right) = -\dfrac{M_2}{2\Delta t} + \dfrac{2\sigma_2}{\sqrt{2\pi}\,\Delta t}e^{-\frac{0.67449^2}{2}}, & M_2 < -0.67449\sigma_2 \\[1em] 0 + \dfrac{2\sigma_2}{\sqrt{2\pi}\,\Delta t}e^{-\frac{M_2^2}{2\sigma_2^2}} + \dfrac{M_2}{\Delta t}\left(1 - \dfrac{2}{\sqrt{2\pi\sigma_2^2}}\int_{-\infty}^{-M_2}e^{-\frac{x^2}{2\sigma_2^2}}dx\right), & -0.67449\sigma_2 < M_2 < 0.67449\sigma_2 \\[1em] \dfrac{M_2 - 0.67449\sigma_2}{2\Delta t} + \dfrac{2\sigma_2}{\sqrt{2\pi}\,\Delta t}e^{-\frac{0.67449^2}{2}} + \dfrac{0.67449\sigma_2}{\Delta t}\left(\dfrac{1}{2}\right) = \dfrac{M_2}{2\Delta t} + \dfrac{2\sigma_2}{\sqrt{2\pi}\,\Delta t}e^{-\frac{0.67449^2}{2}}, & M_2 > 0.67449\sigma_2 \end{cases}$$

$$= \begin{cases} -\dfrac{M_2}{2\Delta t} + \dfrac{0.635553\sigma_2}{\Delta t}, & M_2 < -0.67449\sigma_2 \\[1em] \dfrac{2\sigma_2}{\sqrt{2\pi}\,\Delta t}e^{-\frac{M_2^2}{2\sigma_2^2}} + \dfrac{M_2}{\Delta t}\left(1 - \dfrac{2}{\sqrt{2\pi\sigma_2^2}}\int_{-\infty}^{-M_2}e^{-\frac{x^2}{2\sigma_2^2}}dx\right), & -0.67449\sigma_2 < M_2 < 0.67449\sigma_2 \\[1em] \dfrac{M_2}{2\Delta t} + \dfrac{0.635553\sigma_2}{\Delta t}, & M_2 > 0.67449\sigma_2 \end{cases}$$

35

The following is the derivation for Equation 16.

$$\langle \Delta v_{1,2,3} \rangle = \frac{1}{\sqrt{2\pi\sigma_3^2}} \int_{-\infty}^{\infty} e^{-\frac{x^2}{2\sigma_3^2}} \left(\frac{c|M_3|}{3\Delta t} + \langle \Delta v_{1,2}((1-c)M_3 + x)\rangle\right) dx \quad 40$$

Substituting the delta v from Equation 11, we note that the integral must be broken up into three parts, corresponding to the cases of $M_2$. As $M_2$ is a function of $M_3$, c, and the Gaussian draw x, this becomes $$\langle \Delta v_{1,2,3} \rangle = \frac{c|M_3|}{3\Delta t} + \frac{1}{\sqrt{2\pi\sigma_3^2}} \int_{-\infty}^{-0.67449-(1-c)M_3} e^{-\frac{x^2}{2\sigma_3^2}} \left(-\frac{(1-c)M_3 + x}{2\Delta t} + \frac{0.635553\sigma_2}{\Delta t}\right) dx \quad 50$$

$$+ \frac{1}{\sqrt{2\pi\sigma_3^2}} \int_{-0.67449-(1-c)M_3}^{0.67449-(1-c)M_3} e^{-\frac{x^2}{2\sigma_3^2}} \left(\frac{2\sigma_2}{\sqrt{2\pi}\,\Delta t}e^{-\frac{((1-c)M_3+x)^2}{2\sigma_2^2}} + \frac{(1-c)M_3+x}{\Delta t}\left(1 - \frac{2}{\sqrt{2\pi\sigma_2^2}}\int_{-\infty}^{-(1-c)M_3-x}e^{-\frac{y^2}{2\sigma_2^2}}dy\right)\right) dx \quad 60$$

$$+ \frac{1}{\sqrt{2\pi\sigma_3^2}} \int_{0.67449-(1-c)M_3}^{\infty} e^{-\frac{x^2}{2\sigma_3^2}} \left(\frac{(1-c)M_3 + x}{2\Delta t} + \frac{0.635553\sigma_2}{\Delta t}\right) dx \quad 65$$

The following is the derivation for Equation 18.

$$0 = \frac{|M_3|}{3\Delta t} + \frac{1}{\sqrt{2\pi\sigma_3^2}}\frac{d}{dc}\left[\int_{-\infty}^{-0.67449\sigma_2-(1-c)M_3} e^{-\frac{x^2}{2\sigma_3^2}}\left(\frac{-(1-c)M_3}{2\Delta t} - \frac{x}{2\Delta t} + \frac{0.635553\sigma_2}{\Delta t}\right)dx\right] +$$

$$\frac{1}{\sqrt{2\pi\sigma_3^2}}\frac{d}{dc}\left\{\int_{-0.67449\sigma_2-(1-c)M_3}^{0.67449\sigma_2-(1-c)M_3} e^{-\frac{x^2}{2\sigma_3^2}}\left[\frac{\sqrt{2}\,\sigma_2}{\sqrt{\pi}\,\Delta t}e^{-\frac{((1-c)M_3+x)^2}{2\sigma_2^2}} + \frac{(1-c)M_3+x}{\Delta t}\left(1 - \frac{2}{\sqrt{2\pi\sigma_2^2}}\int_{y=-\infty}^{-(1-c)M_3-x}e^{-\frac{y^2}{2\sigma_2^2}}dy\right)\right]dx\right\} +$$

$$\frac{1}{\sqrt{2\pi\sigma_3^2}}\frac{d}{dc}\left[\int_{0.67449\sigma_2-(1-c)M_3}^{\infty} e^{-\frac{x^2}{2\sigma_3^2}}\left(\frac{(1-c)M_3}{2\Delta t} + \frac{x}{2\Delta t} + \frac{0.635553\sigma_2}{\Delta t}\right)dx\right]$$

Each of the three large elements will be addressed in turn.
First:

$$\frac{1}{\sqrt{2\pi\sigma_3^2}}\frac{d}{dc}\left[\int_{-\infty}^{-0.67449\sigma_2-(1-c)M_3} e^{-\frac{x^2}{2\sigma_3^2}}\left(\frac{-(1-c)M_3}{2\Delta t}-\frac{x}{2\Delta t}+\frac{0.635553\sigma_2}{\Delta t}\right)dx\right]=$$

$$\frac{M_3}{\sqrt{2\pi\sigma_3^2}}e^{-\frac{(-0.67449\sigma_2-(1-c)M_3)^2}{2\sigma_3^2}}\left(\frac{-(1-c)M_3}{2\Delta t}-\frac{-0.67449\sigma_2-(1-c)M_3}{2\Delta t}+\frac{0.635553\sigma_2}{\Delta t}\right)+$$

$$\frac{1}{\sqrt{2\pi\sigma_3^2}}\frac{M_3}{2\Delta t}\int_{-\infty}^{-0.67449\sigma_2-(1-c)M_3} e^{-\frac{x^2}{2\sigma_3^2}}dx=$$

$$\frac{0.38809 M_3\sigma_2}{\sigma_3\Delta t}e^{-\frac{(0.67449\sigma_2-(1-c)M_3)^2}{2\sigma_3^2}}+$$

$$\frac{M_3}{2\sqrt{2\pi}\,\sigma_3\Delta t}\int_{-\infty}^{-0.67449\sigma_2-(1-c)M_3} e^{-\frac{x^2}{2\sigma_3^2}}dx$$

Second:

$$\frac{1}{\sqrt{2\pi\sigma_3^2}}\frac{d}{dc}\left\{\int_{-0.67449\sigma_2-(1-c)M_3}^{0.67449\sigma_2-(1-c)M_3} e^{-\frac{x^2}{2\sigma_3^2}}\left[\frac{\sqrt{2}\,\sigma_2}{\sqrt{\pi}\,\Delta t}e^{-\frac{((1-c)M_3+x)^2}{2\sigma_2^2}}+\frac{(1-c)M_3+x}{\Delta t}\left(1-\frac{2}{\sqrt{2\pi\sigma_2^2}}\int_{y=-\infty}^{-(1-c)M_3-x} e^{-\frac{y^2}{2\sigma_2^2}}dy\right)\right]dx\right\}=$$

$$\frac{1}{\sqrt{2\pi\sigma_3^2}}\left\{M_3 e^{-\frac{(0.67449\sigma_2-(1-c)M_3)^2}{2\sigma_3^2}}\left[\frac{\sqrt{2}\,\sigma_2}{\sqrt{\pi}\,\Delta t}e^{-\frac{0.67449^2}{2}}+\frac{0.67449\sigma_2}{\Delta t}\left(1-\frac{2}{\sqrt{2\pi\sigma_2^2}}\int_{y=-\infty}^{-0.67449\sigma_2} e^{-\frac{y^2}{2\sigma_2^2}}dy\right)\right]\right\}+$$

$$\frac{1}{\sqrt{2\pi\sigma_3^2}}\left\{-M_3 e^{-\frac{(-0.67449\sigma_2-(1-c)M_3)^2}{2\sigma_3^2}}\left[\frac{\sqrt{2}\,\sigma_2}{\sqrt{\pi}\,\Delta t}e^{-\frac{0.67449^2}{2}}-\frac{0.67449\sigma_2}{\Delta t}\left(1-\frac{2}{\sqrt{2\pi\sigma_2^2}}\int_{y=-\infty}^{0.67449\sigma_2} e^{-\frac{y^2}{2\sigma_2^2}}dy\right)\right]\right\}+$$

$$\frac{1}{\sqrt{2\pi\sigma_3^2}}\int_{-0.67449\sigma_2-(1-c)M_3}^{0.67449\sigma_2-(1-c)M_3}\frac{\sqrt{2}\,\sigma_2}{\sqrt{\pi}\,\Delta t}e^{-\frac{x^2}{2\sigma_3^2}}e^{-\frac{((1-c)M_3+x)^2}{2\sigma_2^2}}\left(\frac{2M_3((1-c)M_3+x)}{2\sigma_2^2}\right)dx-$$

-continued $$\frac{1}{\sqrt{2\pi\sigma_3^2}}\int_{-0.67449\sigma_2-(1-c)M_3}^{0.67449\sigma_2-(1-c)M_3} e^{-\frac{x^2}{2\sigma_3^2}}\left[\frac{M_3}{\Delta t}\left(1-\frac{2}{\sqrt{2\pi\sigma_2^2}}\int_{y=-\infty}^{-(1-c)M_3-x} e^{-\frac{y^2}{2\sigma_2^2}}dy\right)\right]dx-$$

$$\frac{1}{\sqrt{2\pi\sigma_3^2}}\int_{-0.67449\sigma_2-(1-c)M_3}^{0.67449\sigma_2-(1-c)M_3} e^{-\frac{x^2}{2\sigma_3^2}}\left[\frac{2M_3((1-c)M_3+x)}{\sqrt{2\pi\sigma_2^2}\,\Delta t}e^{-\frac{(-(1-c)M_3-x)^2}{2\sigma_2^2}}\right]dx=$$

$$\frac{M_3\sigma_2}{\pi\sigma_3\Delta t}e^{-\frac{(0.67449\sigma_2-(1-c)M_3)^2}{2\sigma_3^2}-\frac{0.67449^2}{2}}+$$

$$\frac{0.67449 M_3\sigma_2}{\sqrt{2\pi}\,\sigma_3\Delta t}e^{-\frac{(0.67449\sigma_2-(1-c)M_3)^2}{2\sigma_3^2}}-$$

$$\frac{M_3\sigma_2}{\pi\sigma_3\Delta t}e^{-\frac{(-0.67449\sigma_2-(1-c)M_3)^2}{2\sigma_3^2}-\frac{0.67449^2}{2}}+$$

$$\frac{0.67449 M_3\sigma_2}{\sqrt{2\pi}\,\sigma_3\Delta t}e^{-\frac{(-0.67449\sigma_2-(1-c)M_3)^2}{2\sigma_3^2}}-$$

$$\frac{0.67449 M_3}{\pi\sigma_3\Delta t}e^{-\frac{(0.67449\sigma_2-(1-c)M_3)^2}{2\sigma_3^2}}\int_{y=-\infty}^{-0.67449\sigma_2} e^{-\frac{y^2}{2\sigma_2^2}}dy-$$

$$\frac{0.67449 M_3}{\pi\sigma_3\Delta t}e^{-\frac{(-0.67449\sigma_2-(1-c)M_3)^2}{2\sigma_3^2}}\int_{y=-\infty}^{0.67449\sigma_2} e^{-\frac{y^2}{2\sigma_2^2}}dy+$$

$$\frac{(1-c)M_3^2}{\pi\sigma_2\sigma_3\Delta t}\int_{-0.67449\sigma_2-(1-c)M_3}^{0.67449\sigma_2-(1-c)M_3} e^{-\frac{x^2}{2\sigma_3^2}-\frac{((1-c)M_3+x)^2}{2\sigma_2^2}}dx+$$

$$\frac{M_3}{\pi\sigma_2\sigma_3\Delta t}\int_{-0.67449\sigma_2-(1-c)M_3}^{0.67449\sigma_2-(1-c)M_3} xe^{-\frac{x^2}{2\sigma_3^2}-\frac{((1-c)M_3+x)^2}{2\sigma_2^2}}dx-$$

$$\frac{M_3}{\sqrt{2\pi}\,\sigma_3\Delta t}\int_{-0.67449\sigma_2-(1-c)M_3}^{0.67449\sigma_2-(1-c)M_3} e^{-\frac{x^2}{2\sigma_3^2}}dx+$$

$$\frac{M_3}{\pi\sigma_2\sigma_3\Delta t}\int_{-0.67449\sigma_2-(1-c)M_3}^{0.67449\sigma_2-(1-c)M_3} e^{-\frac{x^2}{2\sigma_3^2}}\int_{y=-\infty}^{-(1-c)M_3-x} e^{-\frac{y^2}{2\sigma_2^2}}dy\,dx-$$

$$\frac{M_3^2(1-c)}{\pi\sigma_2\sigma_3\Delta t}\int_{-0.67449\sigma_2-(1-c)M_3}^{0.67449\sigma_2-(1-c)M_3} e^{-\frac{x^2}{2\sigma_3^2}-\frac{((1-c)M_3-x)^2}{2\sigma_2^2}}dx-$$

$$\frac{M_3}{\pi\sigma_2\sigma_3\Delta t}\int_{-0.67449\sigma_2-(1-c)M_3}^{0.67749\sigma_2-(1-c)M_3} xe^{-\frac{x^2}{2\sigma_3^2}-\frac{((1-c)M_3-x)^2}{2\sigma_2^2}}dx=$$

$$\frac{0.52263 M_3\sigma_2}{\sigma_3\Delta t}e^{-\frac{(0.67449\sigma_2-(1-c)M_3)^2}{2\sigma_3^2}}+$$

-continued $$\frac{0.01553 M_3 \sigma_2}{\sigma_3 \Delta t} e^{-\frac{(-0.67449\sigma_2-(1-c)M_3)^2}{2\sigma_3^2}} -$$

$$\frac{0.67449 M_3}{\pi \sigma_3 \Delta t} e^{-\frac{(0.67449\sigma_2-(1-c)M_3)^2}{2\sigma_3^2}} \frac{\sqrt{2\pi}\,\sigma_2}{4} -$$

$$\frac{0.67449 M_3}{\pi \sigma_3 \Delta t} e^{-\frac{(-0.67449\sigma_2-(1-c)M_3)^2}{2\sigma_3^2}} \frac{3\sqrt{2\pi}\,\sigma_2}{4} -$$

$$\frac{M_3}{\sqrt{2\pi}\,\sigma_3 \Delta t} \int_{-0.67449\sigma_2-(1-c)M_3}^{0.67449\sigma_2-(1-c)M_3} e^{-\frac{x^2}{2\sigma_3^2}} dx +$$

$$\frac{M_3}{\pi \sigma_2 \sigma_3 \Delta t} \int_{-0.67449\sigma_2-(1-c)M_3}^{0.67449\sigma_2-(1-c)M_3} e^{-\frac{x^2}{2\sigma_3^2}} \int_{y=-\infty}^{(1-c)M_3-x} e^{-\frac{y^2}{2\sigma_2^2}} dy\, dx =$$

$$\frac{0.38809 M_3 \sigma_2}{\sigma_3 \Delta t} e^{-\frac{(0.67449\sigma_2-(1-c)M_3)^2}{2\sigma_3^2}} -$$

$$\frac{0.38809 M_3 \sigma_2}{\sigma_3 \Delta t} e^{-\frac{(-0.67449\sigma_2-(1-c)M_3)^2}{2\sigma_3^2}} -$$

$$\frac{M_3}{\sqrt{2\pi}\,\sigma_3 \Delta t} \int_{-0.67449\sigma_2-(1-c)M_3}^{0.67449\sigma_2-(1-c)M_3} e^{-\frac{x^2}{2\sigma_3^2}} dx +$$

$$\frac{M_3}{\pi \sigma_2 \sigma_3 \Delta t} \int_{-0.67449\sigma_2-(1-c)M_3}^{0.67449\sigma_2-(1-c)M_3} e^{-\frac{x^2}{2\sigma_3^2}} \int_{y=-\infty}^{(1-c)M_3-x} e^{-\frac{y^2}{2\sigma_2^2}} dy\, dx$$

Third:

$$\frac{1}{\sqrt{2\pi\sigma_3^2}} \frac{d}{dc}\left[\int_{0.67449\sigma_2-(1-c)M_3}^{\infty} e^{-\frac{x^2}{2\sigma_3^2}} \left(\frac{(1-c)M_3}{2\Delta t} + \frac{x}{2\Delta t} + \frac{0.63553\sigma_2}{\Delta t}\right) dx\right] = -\frac{M_3}{\sqrt{2\pi\sigma_3^2}} e^{-\frac{(0.67449\sigma_2-(1-c)M_3)^2}{2\sigma_3^2}} \left(\frac{(1-c)M_3}{2\Delta t} + \frac{0.67449\sigma_2-(1-c)M_3}{2\Delta t} + \frac{0.635553\sigma_2}{\Delta t}\right) +$$

$$\frac{1}{\sqrt{2\pi\sigma_3^2}} \left(-\frac{M_3}{2\Delta t}\right) \int_{0.67449\sigma_2-(1-c)M_3}^{\infty} e^{-\frac{x^2}{2\sigma_3^2}} dx =$$

$$-\frac{0.38809 M_3 \sigma_2}{\sigma_3 \Delta t} e^{-\frac{(0.67449\sigma_2-(1-c)M_3)^2}{2\sigma_3^2}} -$$

$$\frac{M_3}{2\Delta t \sqrt{2\pi\sigma_3^2}} \int_{0.67449\sigma_2-(1-c)M_3}^{\infty} e^{-\frac{x^2}{2\sigma_3^2}} dx =$$

$$-\frac{0.38809 M_3 \sigma_2}{\sigma_3 \Delta t} e^{-\frac{(0.67449\sigma_2-(1-c)M_3)^2}{2\sigma_3^2}} -$$

$$\frac{M_3}{2\Delta t}\left(1 - \frac{1}{\sqrt{2\pi\sigma_3^2}} \int_{-\infty}^{0.67449\sigma_2-(1-c)M_3} e^{-\frac{x^2}{2\sigma_3^2}} dx\right) =$$

$$-\frac{0.38809 M_3 \sigma_2}{\sigma_3 \Delta t} e^{-\frac{(0.67449\sigma_2-(1-c)M_3)^2}{2\sigma_3^2}} - \frac{M_3}{2\Delta t} +$$

-continued $$\frac{M_3}{2\Delta t \sqrt{2\pi\sigma_3^2}} \int_{-\infty}^{0.67449\sigma_2-(1-c)M_3} e^{-\frac{x^2}{2\sigma_3^2}} dx$$

Combining the four terms in the sum, multiplying by $\Delta t$, and dividing by $M_3$, the overall equation becomes:

$$0 = \frac{|M_3|}{3 M_3} + \frac{0.38809 \sigma_2}{\sigma_3} e^{-\frac{(-0.67449\sigma_2-(1-c)M_3)^2}{2\sigma_3^2}} +$$

$$\frac{1}{2\sqrt{2\pi}\,\sigma_3} \int_{-\infty}^{-0.67449\sigma_2-(1-c)M_3} e^{-\frac{x^2}{2\sigma_3^2}} dx +$$

$$\frac{0.38809 \sigma_2}{\sigma_3} e^{-\frac{(0.67449\sigma_2-(1-c)M_3)^2}{2\sigma_3^2}} -$$

$$\frac{0.38809 \sigma_2}{\sigma_3} e^{-\frac{(-0.67449\sigma_2-(1-c)M_3)^2}{2\sigma_3^2}} -$$

$$\frac{1}{\sqrt{2\pi}\,\sigma_3} \int_{-0.67449\sigma_2-(1-c)M_3}^{0.67449\sigma_2-(1-c)M_3} e^{-\frac{x^2}{2\sigma_3^2}} dx +$$

$$\frac{1}{\pi \sigma_2 \sigma_3} \int_{-0.67449\sigma_2-(1-c)M_3}^{0.67449\sigma_2-(1-c)M_3} e^{-\frac{x^2}{2\sigma_3^2}} \int_{y=-\infty}^{(1-c)M_3-x} e^{-\frac{y^2}{2\sigma_2^2}} dy\, dx -$$

$$\frac{0.38809 \sigma_2}{\sigma_3} e^{-\frac{(0.67449\sigma_2-(1-c)M_3)^2}{2\sigma_3^2}} - \frac{1}{2} +$$

$$\frac{1}{2\sqrt{2\pi\sigma_3^2}} \int_{-\infty}^{0.67449\sigma_2-(1-c)M_3} e^{-\frac{x^2}{2\sigma_3^2}} dx$$

$$0 = \frac{|M_3|}{3 M_3} - \frac{1}{2} + \frac{1}{2\sqrt{2\pi}\,\sigma_3} \int_{-\infty}^{-0.67449\sigma_2-(1-c)M_3} e^{-\frac{x^2}{2\sigma_3^2}} dx -$$

$$\frac{1}{\sqrt{2\pi}\,\sigma_3} \int_{-0.67449\sigma_2-(1-c)M_3}^{0.67449\sigma_2-(1-c)M_3} e^{-\frac{x^2}{2\sigma_3^2}} dx +$$

$$\frac{1}{\pi \sigma_2 \sigma_3} \int_{-0.67449\sigma_2-(1-c)M_3}^{0.67449\sigma_2-(1-c)M_3} e^{-\frac{x^2}{2\sigma_3^2}} \left(\sqrt{2\pi}\,\sigma_2 - \int_{y=-\infty}^{x+(1-c)M_3} e^{-\frac{y^2}{2\sigma_2^2}} dy\right) dx +$$

$$\frac{1}{2\sqrt{2\pi\sigma_3^2}} \int_{-\infty}^{0.67449\sigma_2-(1-c)M_3} e^{-\frac{x^2}{2\sigma_3^2}} dx +$$

$$\frac{1}{2\sqrt{2\pi\sigma_3^2}} \int_{-0.67449\sigma_2-(1-c)M_3}^{0.67449\sigma_2-(1-c)M_3} e^{-\frac{x^2}{2\sigma_3^2}} dx$$

$$0 = \frac{|M_3|}{3 M_3} - \frac{1}{2} + \frac{1}{\sqrt{2\pi}\,\sigma_3} \int_{-\infty}^{-0.67449\sigma_2-(1-c)M_3} e^{-\frac{x^2}{2\sigma_3^2}} dx +$$

$$\frac{1}{\pi \sigma_2 \sigma_3} \int_{x=-0.67449\sigma_2-(1-c)M_3}^{0.67449\sigma_2-(1-c)M_3} e^{-\frac{x^2}{2\sigma_3^2}} \left(\frac{3\sqrt{2\pi}\,\sigma_2}{4} - \right.$$

-continued $$\int_{y=-\infty}^{x+(1-c)M_3} e^{-\frac{y^2}{2\sigma_2^2}} dy \Bigg) dx$$

Substituting $u=(x+(1-c)M_3)/\sigma_3$ and $v=y/\sigma_2$, this becomes $$0 = \frac{|M_3|}{3M_3} - \frac{1}{2} + \frac{1}{\sqrt{2\pi}} \int_{u=-\infty}^{-0.67449\frac{\sigma_2}{\sigma_3}} e^{-\frac{1}{2}\left(u-\frac{(1-c)M_3}{\sigma_3}\right)^2} du +$$

$$\sqrt{\frac{2}{\pi}} \int_{u=-0.67449\frac{\sigma_2}{\sigma_3}}^{0.67449\frac{\sigma_2}{\sigma_3}} e^{-\frac{1}{2}\left(u-\frac{(1-c)M_3}{\sigma_3}\right)^2} \left(\frac{3}{4} - \frac{1}{\sqrt{2\pi}} \int_{v=-\infty}^{\frac{\sigma_3}{\sigma_2}u} e^{-\frac{v^2}{2}} dv \right) du$$

The following is the derivation for Equation 20.
The steps used in creating Equations 12 through 15 are used here for a generic $i^{th}$ time step, where $i=1$ is the final step and $i$ increases with time to go.
From Equation 21, the total divert used through step $i$ can be represented as $$\langle \Delta v_{1 \ldots i} \rangle = \frac{|M_i|}{i\Delta t} + C_i.$$

It can be established via recursion that this law will be true for future steps. The divert used in step $i+1$ will equal $$\Delta v_{i+1} = \frac{c|M_{i+1}|}{(i+1)\Delta t}.$$

With this amount of a divert, the miss estimate for step $i$ will be given by $$M_i = (1-c)M_{i+1} + G(0, \sigma_{i+1}),$$

where G is a random Gaussian draw with mean zero and standard deviation $\sigma_{i+1}$. Substituting this form of $M_i$ into the first equation in this section, it can be seen that $$\langle \Delta v_{1 \ldots i+1} \rangle =$$

$$\Delta v_{i+1} + \langle \Delta v_{1 \ldots i} \rangle = \frac{c|M_{i+1}|}{(i+1)\Delta t} + \left\{ \frac{|(1-c)M_{i+1} + G(0, \sigma_{i+1})|}{i\Delta t} \right\} + C_i.$$

Again integrating over all possible values of G, this becomes $$\langle \Delta v_{1 \ldots i+1} \rangle =$$

$$\frac{c|M_{i+1}|}{(i+1)\Delta t} + \frac{1}{\sqrt{2\pi}\,\sigma_{i+1}} \int_{-\infty}^{\infty} e^{-\frac{x^2}{2\sigma_{i+1}^2}} \frac{|(1-c)M_{i+1}+x|}{i\Delta t} dx + C_i$$

$$\langle \Delta v_{1 \ldots i+1} \rangle = \frac{c|M_{i+1}|}{(i+1)\Delta t} -$$

$$\frac{1}{\sqrt{2\pi}\,\sigma_{i+1}} \int_{-\infty}^{-(1-c)M_{i+1}} e^{-\frac{x^2}{2\sigma_{i+1}^2}} \frac{(1-c)M_{i+1}+x}{i\Delta t} dx +$$

$$\frac{1}{\sqrt{2\pi}\,\sigma_{i+1}} \int_{-(1-c)M_{i+1}}^{\infty} e^{-\frac{x^2}{2\sigma_{i+1}^2}} \frac{(1-c)M_{i+1}+x}{i\Delta t} dx + C_i$$

$$\langle \Delta v_{1 \ldots i+1} \rangle = \frac{c|M_{i+1}|}{(i+1)\Delta t} - \frac{(1-c)M_{i+1}}{\sqrt{2\pi}\,\sigma_{i+1} i\Delta t} \int_{-\infty}^{-(1-c)M_{i+1}} e^{-\frac{x^2}{2\sigma_{i+1}^2}} dx -$$

$$\frac{1}{\sqrt{2\pi}\,\sigma_{i+1} i\Delta t} \int_{-\infty}^{-(1-c)M_{i+1}} xe^{-\frac{x^2}{2\sigma_{i+1}^2}} dx +$$

$$\frac{(1-c)M_{i+1}}{\sqrt{2\pi}\,\sigma_{i+1} i\Delta t} \int_{-(1-c)M_{i+1}}^{\infty} e^{-\frac{x^2}{2\sigma_{i+1}^2}} dx +$$

$$\frac{1}{\sqrt{2\pi}\,\sigma_{i+1} i\Delta t} \int_{-(1-c)M_{i+1}}^{\infty} xe^{-\frac{x^2}{2\sigma_{i+1}^2}} dx + C_i$$

$$\langle \Delta v_{1 \ldots i+1} \rangle = \frac{c|M_{i+1}|}{(i+1)\Delta t} - \frac{(1-c)M_{i+1}}{\sqrt{2\pi}\,\sigma_{i+1} i\Delta t} \int_{-\infty}^{-(1-c)M_{i+1}} e^{-\frac{x^2}{2\sigma_{i+1}^2}} dx +$$

$$\frac{\sigma_{i+1}}{\sqrt{2\pi}\,i\Delta t} e^{-\frac{x^2}{2\sigma_{i+1}^2}} \Bigg|_{-\infty}^{-(1-c)M_{i+1}} + \frac{(1-c)M_{i+1}}{i\Delta t} -$$

$$\frac{(1-c)M_{i+1}}{\sqrt{2\pi}\,\sigma_{i+1} i\Delta t} \int_{-\infty}^{-(1-c)M_{i+1}} e^{-\frac{x^2}{2\sigma_{i+1}^2}} dx -$$

$$\frac{\sigma_{i+1}}{\sqrt{2\pi}\,i\Delta t} e^{-\frac{x^2}{2\sigma_{i+1}^2}} \Bigg|_{-(1-c)M_{i+1}}^{\infty} + C_i$$

$$\langle \Delta v_{1 \ldots i+1} \rangle = \frac{c|M_{i+1}|}{(i+1)\Delta t} + \frac{(1-c)M_{i+1}}{i\Delta t} + \frac{2\sigma_{i+1}}{\sqrt{2\pi}\,i\Delta t} e^{-\frac{((1-c)M_{i+1})^2}{2\sigma_{i+1}^2}} +$$

$$C_i - \frac{2(1-c)M_{i+1}}{\sqrt{2\pi}\,\sigma_{i+1} i\Delta t} \int_{-\infty}^{-(1-c)M_{i+1}} e^{-\frac{x^2}{2\sigma_{i+1}^2}} dx$$

The following is the derivation for Equation 21.

$$\frac{d\langle \Delta v_{1 \ldots i+1} \rangle}{dc} =$$

$$\frac{d}{dc}\left[\frac{c|M_{i+1}|}{(i+1)\Delta t}\right] + \frac{d}{dc}\left[\frac{(1-c)M_{i+1}}{i\Delta t}\right] + \frac{d}{dc}\left[\frac{2\sigma_{i+1}}{\sqrt{2\pi}\,i\Delta t} e^{-\frac{((1-c)M_{i+1})^2}{2\sigma_{i+1}^2}}\right] +$$

$$\frac{d}{dc}[C_i] - \frac{d}{dc}\left[\frac{2(1-c)M_{i+1}}{\sqrt{2\pi\sigma_{i+1}^2}\,i\Delta t} \int_{-\infty}^{-(1-c)M_{i+1}} e^{-\frac{x^2}{2\sigma_{i+1}^2}} dx\right]$$

Assuming that the $C_i$ is constant, $$\frac{d\langle \Delta v_{1 \ldots i+1} \rangle}{dc} = \frac{|M_{i+1}|}{(i+1)\Delta t} - \frac{M_{i+1}}{i\Delta t} + \frac{2\sigma_{i+1}}{\sqrt{2\pi}\,i\Delta t} e^{-\frac{((1-c)M_{i+1})^2}{2\sigma_{i+1}^2}} \frac{(1-c)M_{i+1}^2}{\sigma_{i+1}^2} +$$

$$\frac{2M_{i+1}}{\sqrt{2\pi\sigma_{i+1}^2}\,i\Delta t} \int_{-\infty}^{-(1-c)M_{i+1}} e^{-\frac{x^2}{2\sigma_{i+1}^2}} dx -$$

$$\frac{2(1-c)M_{i+1}}{\sqrt{2\pi\sigma_{i+1}^2}\,i\Delta t} e^{-\frac{((1-c)M_{i+1})^2}{2\sigma_{i+1}^2}} M_{i+1}$$

-continued $$\frac{d\langle\Delta v_{1\ldots i+1}\rangle}{dc} = \frac{|M_{i+1}|}{(i+1)\Delta t} - \frac{M_{i+1}}{i\Delta t} + \frac{2M_{i+1}}{\sqrt{2\pi\sigma_{i+1}^2}\,i\Delta t}\int_{-\infty}^{-(1-c)M_{i+1}} e^{-\frac{x^2}{2\sigma_{i+1}^2}}\,dx$$

Setting the derivative to zero and solving:

$$0 = \frac{|M_{i+1}|}{(i+1)\Delta t} - \frac{M_{i+1}}{i\Delta t} + \frac{2M_{i+1}}{\sqrt{2\pi\sigma_{i+1}^2}\,i\Delta t}\int_{-\infty}^{-(1-c)M_{i+1}} e^{-\frac{x^2}{2\sigma_{i+1}^2}}\,dx$$

$$\frac{1}{\sqrt{2\pi\sigma_{i+1}^2}}\int_{-\infty}^{-(1-c)M_{i+1}} e^{-\frac{x^2}{2\sigma_{i+1}^2}}\,dx = \frac{1}{2} - \frac{i|M_{i+1}|}{2(i+1)M_{i+1}}$$

$$\frac{1}{\sqrt{2\pi\sigma_{i+1}^2}}\int_{-\infty}^{(1-c)M_{i+1}} e^{-\frac{x^2}{2\sigma_{i+1}^2}}\,dx = \frac{1}{2} + \frac{i|M_{i+1}|}{2(i+1)M_{i+1}}$$

EXAMPLE EMBODIMENTS

Example No. 1 is a missile guidance system that includes one or more computer processors. The computer processors are configured to estimate a time to go. The time to go is an amount of time until a missile would reach a closest point of approach to a target. The computer processors are also configured to estimate a zero-effort miss distance along a zero-effort miss vector. The zero-effort miss distance is a distance by which the missile would miss the target if the missile performs no future maneuvers. The computer processors are also configured to determine a tolerance for the zero-effort miss distance. The tolerance is a function of the time to go. The computer processors are further configured to modify a course of the missile by adjusting an expenditure of propellant such that the zero-effort miss distance in excess of the tolerance is removed from future consideration.

Example No. 2 includes all the features of Example No. 1 and further includes a system wherein the computer processors are configured to repeat the steps of Example No. 1 during the missile's flight.

Example No. 3 includes all the features of Example Nos. 1-2, and optionally includes a system wherein the computer processor is configured to execute the steps of Example No. 1 during a midcourse time period of a flight of the missile, thereby preparing the missile for a terminal phase of the flight of the missile; and thereafter ceasing execution of the steps of Example No. 1, thereby handing off control of the missile to the terminal phase.

Example No. 4 includes all the features of Example Nos. 1-3, and optionally includes a system wherein tolerance values as a function of the time to go are generated prior to a flight of the missile, and wherein the tolerance values are determined by a minimization of an integral of an expectation value of an absolute value of an acceleration of the missile during a midcourse phase and a terminal guidance phase of the missile.

Example No. 5 includes all the features of Example Nos. 1-4, and optionally includes a system wherein the determination of the tolerance values is a function of a rate of change over time in an uncertainty in the zero-effort miss distance, assuming no evasive maneuver by the target.

Example No. 6 includes all the features of Example Nos. 1-5, and optionally includes a system wherein the missile is capable of maneuver in a plane orthogonal to a line of sight from the missile to the target.

Example No. 7 includes all the features of Example Nos. 1-6, and optionally includes a system including a computer processor configured to cause the missile to roll such that a single thruster points along the zero-effort miss vector, and to execute the steps of Example No. 1 for the single thruster.

Example No. 8 includes all the features of Example Nos. 1-7, and optionally includes a system including a computer processor configured to apply the steps of Example No. 1 independently along two orthogonal axes in a maneuver plane.

Example No. 9 includes all the features of Example Nos. 1-8, and optionally includes a system wherein the adjustment of an expenditure of a propellant is executed when the zero-effort miss distance exceeds the tolerance, and the expenditure of propellant is executed to cause a divert such that the zero-effort miss distance becomes equal to or less than the tolerance.

Example No. 10 includes all the features of Example Nos. 1-9, and optionally includes a system including a computer processor configured to expend no propellant when the zero-effort miss distance is less than the tolerance.

Example No. 11 is a computer readable medium that includes instructions that when executed by a processor estimate a time to go. The time to go is an amount of time until a missile would reach a closest point of approach to a target. The computer readable medium further includes instructions that estimate a zero-effort miss distance along a zero-effort miss vector. The zero-effort miss distance is a distance by which the missile would miss the target if the missile performs no future maneuvers. The computer readable medium also includes instructions that determine a tolerance for the zero-effort miss distance. The tolerance is a function of the time to go. The computer readable medium further includes instructions that modify a course of the missile by adjusting an expenditure of propellant such that the zero-effort miss distance in excess of the tolerance is removed from future consideration.

Example No. 12 includes all the features of Example No. 11 and further includes instructions that repeat the steps of Example No. 11 during the missile's flight.

Example No. 13 includes all the features of Example Nos. 11-12, and optionally includes instructions that execute the steps of Example No. 1 during a midcourse time period of a flight of the missile, thereby preparing the missile for a terminal phase of the flight of the missile; and thereafter ceasing execution of the steps of Example No. 11, thereby handing off control of the missile to the terminal phase.

Example No. 14 includes all the features of Example Nos. 11-13, and optionally includes instructions that generate tolerance values as a function of the time to go prior to a flight of the missile, wherein the tolerance values are determined by a minimization of an integral of an expectation value of an absolute value of an acceleration of the missile during a midcourse phase and a terminal guidance phase of the missile.

Example No. 15 includes all the features of Example Nos. 11-14, and optionally includes instructions that determine the tolerance values as a function of a rate of change over time in an uncertainty in the zero-effort miss distance, assuming no evasive maneuver by the target.

Example No. 16 includes all the features of Example Nos. 11-15, and optionally includes instructions such that the missile is capable of maneuver in a plane orthogonal to a line of sight from the missile to the target.

Example No. 17 includes all the features of Example Nos. 11-16, and optionally includes instructions that cause the missile to roll such that a single thruster points along the zero-effort miss vector, and to execute the steps of Example No. 1 for the single thruster.

Example No. 18 includes all the features of Example Nos. 11-17, and optionally includes instructions to apply the steps of Example No. 11 independently along two orthogonal axes in a maneuver plane.

Example No. 19 includes all the features of Example Nos. 11-18, and optionally includes instructions to such that the adjustment of an expenditure of a propellant is executed when the zero-effort miss distance exceeds the tolerance, and the expenditure of propellant is executed to cause a divert such that the zero-effort miss distance becomes equal to or less than the tolerance.

Example No. 20 includes all the features of Example Nos. 11-19, and optionally includes instructions to expend no propellant when the zero-effort miss distance is less than the tolerance.

Example No. 21 is a method for missile guidance that includes estimating a time to go. The time to go includes an amount of time until the missile would reach a closest point of approach to a target. The method also includes estimating a zero-effort miss distance along a zero-effort miss vector. The zero-effort miss distance includes a distance by which the missile would miss the target if the missile performs no future maneuvers. The method further includes determining a tolerance for the zero-effort miss distance. The tolerance is a function of the time to go. The method also includes modifying a course of the missile by adjusting an expenditure of propellant such that the zero-effort miss distance in excess of the tolerance is removed from future consideration.

Figure 3A:
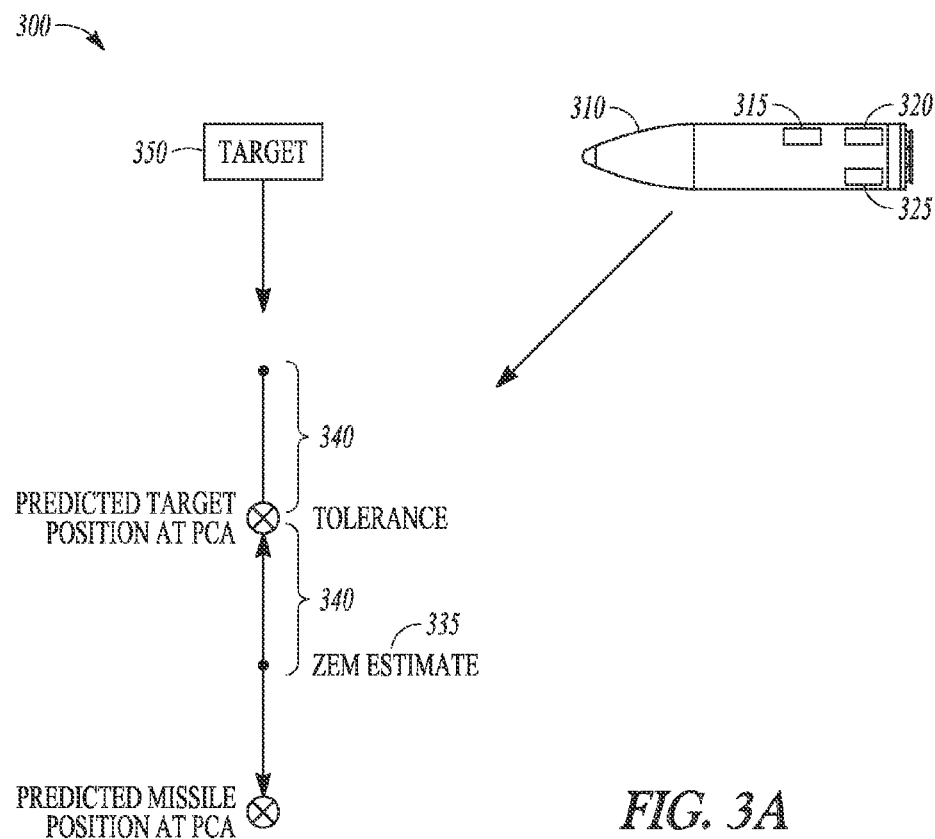
FIGS. 3A and 3B are overview diagrams of a guidance system 300 for missile divert minimization.
Figure 3B:
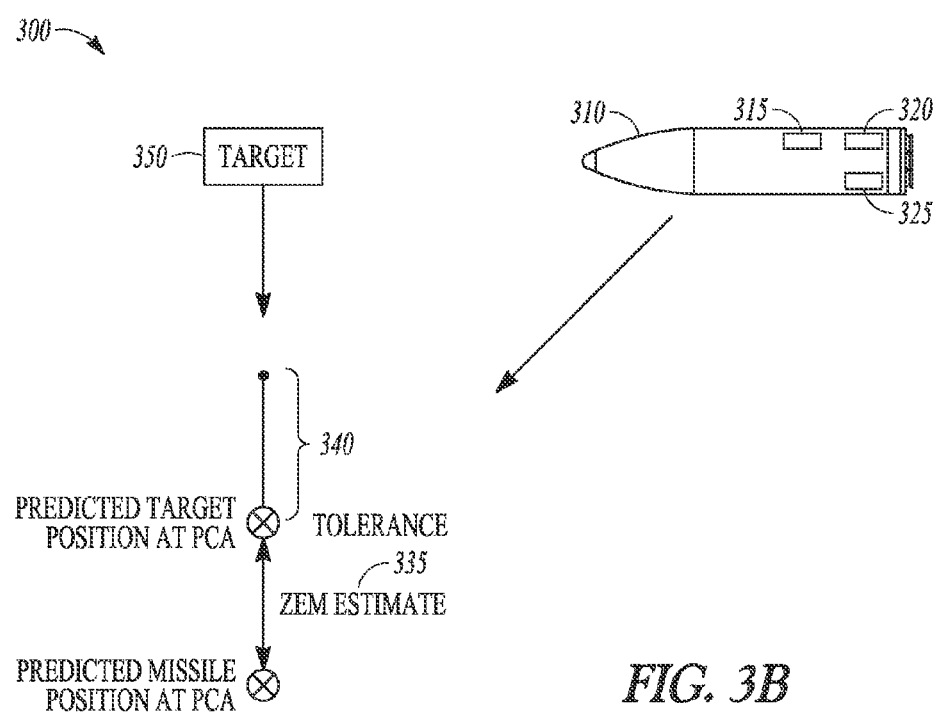

FIGS. 3A and 3B are overview diagrams of a guidance system 300 for missile divert minimization. A missile or other interceptor 310 includes a processor 315, propellant storage 320, and a control system 325. The processor 315, among other things, estimates the zero-effort miss distance 335 and the tolerance 340 associated with that zero-effort miss distance in relation to a target 350. While not drawn to scale, FIG. 3A illustrates an estimated zero-effort miss distance 335 and a tolerance 340. After executing the calculations that remove all of the zero-effort miss distance except for the tolerance, the newly estimated zero-effort miss distance 335 and tolerance 340 are illustrated in FIG. 3B. It is noted that in FIGS. 3A and 3B, both the missile 310 and the target 350 are in motion, and there is some point at which the missile 310 and the target 350 will have their closest approach. As noted above, the goal is that the missile 310 will steer such that the point of closest approach is actually an impact. However, FIGS. 3A and 3B are illustrating the phase of guidance wherein the attempt is to place the missile 310 within the tolerance of the current time to go.

In the foregoing detailed description of embodiments of the invention, various features are grouped together in one or more embodiments for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The abstract is provided to comply with 37 C.F.R. 1.72(b) to allow a reader to quickly ascertain the nature and gist of the technical disclosure. The Abstract is submitted with the understanding that it will not be used to interpret or limit the scope or meaning of the claims.

The invention claimed is:

1. A missile guidance system comprising:
a computer processor;
a control system coupled to the computer processor; and
a propellant storage container coupled to the control system;
wherein the computer processor is operable to:
(a) estimate a time to go, the time to go comprising an amount of time until a missile would reach a closest point of approach to a target;
(b) estimate a zero-effort miss distance along a zero-effort miss vector, the zero-effort miss distance comprising a distance by which the missile would miss the target if the missile performs no future maneuvers;
(c) determine a tolerance for the zero-effort miss distance, the tolerance being a function of the time to go; and
(d) modify a course of the missile by adjusting an expenditure of propellant such that the zero-effort miss distance in excess of the tolerance is removed from future consideration.

2. The missile guidance system of claim 1, wherein the system is configured to repeat steps (a) through (d) until the missile intercepts the target.

3. The missile guidance system of claim 1, wherein the system is configured to execute steps (a) through (d) during a midcourse time period of a flight of the missile, thereby preparing the missile for a terminal phase of the flight of the missile; and thereafter ceasing execution of steps (a) through (d), thereby handing off control of the missile to the terminal phase.

4. The missile guidance system of claim 1, wherein tolerance values as a function of the time to go are generated prior to a flight of the missile, wherein the tolerance values are determined by a minimization of an integral of an expectation value of an absolute value of an acceleration of the missile during a midcourse phase and a terminal guidance phase of the missile.

5. The missile guidance system of claim 4, wherein the determination of the tolerance values is a function of a rate of change over time in an uncertainty in the zero-effort miss distance, assuming no evasive maneuver by the target.

6. The missile guidance system of claim 1, wherein the missile is capable of maneuver in a plane orthogonal to a line of sight from the missile to the target.

7. The missile guidance system of claim 6, wherein the system is configured to cause the missile to roll such that a single thruster points along the zero-effort miss vector, and to execute steps (a)-(d) for the single thruster.

8. The missile guidance system of claim 6, wherein the system is configured to apply steps (a)-(d) independently along two orthogonal axes in a maneuver plane.

9. The missile guidance system of claim 1, wherein the adjustment of an expenditure of a propellant is executed when the zero-effort miss distance exceeds the tolerance, and the expenditure of propellant is executed to cause a divert such that the zero-effort miss distance becomes equal to or less than the tolerance.

10. The missile guidance system of claim 1, wherein the system is configured to expend no propellant when the zero-effort miss distance is less than the tolerance.

11. A non-transitory computer readable storage medium comprising instructions that when executed by a processor execute a process comprising:
  (a) estimating a time to go, the time to go comprising an amount of time until a missile would reach a closest point of approach to a target;
  (b) estimating a zero-effort miss distance along a zero-effort miss vector, the zero-effort miss distance comprising a distance by which the missile would miss the target if the missile performs no future maneuvers;
  (c) determining a tolerance for the zero-effort miss distance, the tolerance being a function of the time to go; and
  (d) modifying a course of the missile by adjusting an expenditure of propellant such that the zero-effort miss distance in excess of the tolerance is removed from future consideration.

12. The non-transitory computer readable medium of claim 11, further comprising instructions configured to repeat steps (a) through (d) until the missile intercepts the target.

13. The non-transitory computer readable medium of claim 11, further comprising instructions configured to execute steps (a) through (d) during a midcourse time period of a flight of the missile, thereby preparing the missile for a terminal phase of the flight of the missile; and thereafter ceasing execution of steps (a) through (d), thereby handing off control of the missile to the terminal phase.

14. The non-transitory computer readable medium of claim 11, wherein tolerance values as a function of the time to go are generated prior to a flight of the missile, and wherein the tolerance values are determined by a minimization of an integral of an expectation value of an absolute value of an acceleration of the missile during a midcourse phase and a terminal guidance phase of the missile.

15. The non-transitory computer readable medium of claim 14, wherein the determination of the tolerance values is a function of a rate of change over time in an uncertainty in the zero-effort miss distance, assuming no evasive maneuver by the target.

16. The non-transitory computer readable medium of claim 11, further comprising instructions configured to cause the missile to maneuver in a plane orthogonal to a line of sight from the missile to the target.

17. The non-transitory computer readable medium of claim 16, further comprising instructions configured to cause the missile to roll such that a single thruster points along the zero-effort miss vector, and to execute steps (a)-(d) for the single thruster.

18. The non-transitory computer readable medium of claim 16, further comprising instructions configured to apply steps (a)-(d) independently along two orthogonal axes in a maneuver plane.

19. The non-transitory computer readable medium of claim 11, wherein the adjustment of an expenditure of a propellant is executed when the zero-effort miss distance exceeds the tolerance, and the expenditure of propellant is executed to cause a divert such that the zero-effort miss distance becomes equal to or less than the tolerance.

20. The non-transitory computer readable medium of claim 11, further comprising instructions configured to expend no propellant when the zero-effort miss distance is less than the tolerance.

21. A method for missile guidance comprising:
  (a) estimating a time to go, the time to go comprising an amount of time until the missile would reach a closest point of approach to a target;
  (b) estimating a zero-effort miss distance along a zero-effort miss vector, the zero-effort miss distance comprising a distance by which the missile would miss the target if the missile performs no future maneuvers;
  (c) determining a tolerance for the zero-effort miss distance, the tolerance being a function of the time to go; and
  (d) modifying a course of the missile by adjusting an expenditure of propellant such that the zero-effort miss distance in excess of the tolerance is removed from future consideration.

* * * * *